US012525193B2

(12) United States Patent
Park et al.

(10) Patent No.: US 12,525,193 B2
(45) Date of Patent: Jan. 13, 2026

(54) DISPLAY DEVICE

(71) Applicant: SAMSUNG DISPLAY CO., LTD., Yongin-si (KR)

(72) Inventors: Kyong Tae Park, Yongin-si (KR); Sung Jun Kim, Yongin-si (KR); Jun Yeong Seol, Yongin-si (KR); Jae Bok Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/381,950

(22) Filed: Oct. 19, 2023

(65) Prior Publication Data

US 2024/0071316 A1 Feb. 29, 2024

Related U.S. Application Data

(63) Continuation of application No. 17/700,807, filed on Mar. 22, 2022, now Pat. No. 11,823,627.

(30) Foreign Application Priority Data

Aug. 6, 2021 (KR) ........................ 10-2021-0104175

(51) Int. Cl.

*G09G 3/3266* (2016.01)
*G09G 3/00* (2006.01)
*G09G 3/3275* (2016.01)

(52) U.S. Cl.

CPC ........... *G09G 3/3266* (2013.01); *G09G 3/006* (2013.01); *G09G 3/3275* (2013.01);

(Continued)

(58) Field of Classification Search

CPC ......... G02F 1/136259; G02F 1/136263; G02F 1/136272; G02F 1/136286; G02F 1/1309; G09G 2330/08; G09G 3/3233; G09G 2330/10; G09G 2300/0426; G09G 3/006; G09G 2300/0413; G09G 2300/0819; G09G 3/3225; G09G 3/3648; G09G 2300/0861;

(Continued)

(56) References Cited

U.S. PATENT DOCUMENTS 9,536,472 B2 1/2017 Park et al.
9,754,532 B2 9/2017 Park et al.

(Continued)

FOREIGN PATENT DOCUMENTS

KR 1020140046327 A 4/2014
KR 102150022 B1 9/2020
KR 1020210054114 A 5/2021

*Primary Examiner* — Sujit Shah

(74) *Attorney, Agent, or Firm* — CANTOR COLBURN LLP

(57) ABSTRACT

A display device includes: a display panel including a display area including pixels and a non-display area including a dummy pixel; a scan driver which supplies a scan signal to the display panel; a data driver which supplies a data signal to the display panel; and a timing controller which supplies a first control signal for controlling the scan driver and a second control signal for controlling the data driver. The dummy pixel is connected to a bad pixel among the pixels in the display area through a repair line, and a connection of the dummy pixel to the repair line is cut off in an initialization phase in which a voltage of an initialization power source is supplied.

9 Claims, 14 Drawing Sheets

(52) U.S. Cl.
CPC . *G09G 2300/0852* (2013.01); *G09G 2310/08* (2013.01); *G09G 2370/16* (2013.01)

(58) Field of Classification Search
CPC ... G09G 2300/0439; G09G 2320/0295; G09G 3/3208; G09G 3/3266; G09G 3/3275; G09G 2300/0852; G09G 2310/08; G09G 2370/16; H01L 27/124; H01L 27/1244; H10K 59/131; H10K 71/861; H10K 59/1213; H10K 59/88
See application file for complete search history.

(56) References Cited

U.S. PATENT DOCUMENTS 11,217,149 B2 1/2022 In et al.
2011/0080395 A1 4/2011 Chung
2013/0271435 A1 10/2013 Uchino et al.
2014/0347401 A1* 11/2014 Hwang ................ G09G 3/3233 345/82
2015/0103014 A1 4/2015 Kim et al.
2015/0348466 A1* 12/2015 Park ..................... G09G 3/3233 345/82
2016/0035283 A1* 2/2016 Park ..................... G09G 3/3258 345/78
2016/0104409 A1 4/2016 Jeon et al.
2016/0104430 A1* 4/2016 Park ..................... G09G 3/3291 345/204
2016/0189585 A1* 6/2016 Na ....................... G09G 3/3233 345/55
2016/0217735 A1 7/2016 Park et al.
2016/0335950 A1 11/2016 Kang et al.
2018/0175135 A1* 6/2018 Lim ..................... H10K 50/805
2018/0300051 A1 10/2018 Kim
2020/0043411 A1* 2/2020 Tsuge ................... G09G 3/3266
2020/0126478 A1 4/2020 Lee et al.
2020/0184886 A1 6/2020 Chun
2020/0342808 A1 10/2020 Han et al.

* cited by examiner

DISPLAY DEVICE

This application is a continuation of U.S. patent application Ser. No. 17/700,807, filed on Mar. 22, 2022, which claims priority to Korean Patent Application No. 10-2021-0104175, filed on, Aug. 6, 2021, and all the benefits accruing therefrom under 35 U.S.C. § 119, the content of which in its entirety is herein incorporated by reference.

BACKGROUND

1. Field

The present disclosure generally relates to a display device.

2. Description of the Related Art

With the development of information society, the demand for various types of display devices for displaying an image is increasing. Various display devices, such as a liquid crystal display and an organic light emitting display device, have been recently used.

A defect may occur in transistors included in a pixel circuit during a manufacturing process of a display device. Therefore, the yield of the display device may be deteriorated. In order to solve this problem, repair pixels (or dummy pixels) may be formed in the display device, and a bad pixel which has a defect may be connected to any one of the repair pixels (or dummy pixels), thereby repairing the bad pixel.

In a repair method, connection between transistors and a light emitting element of the bad pixel may be cut off, and transistors of the repair pixel (or dummy pixel) and an anode electrode of the light emitting element of the bad pixel may be connected to each other by using a repair line. As a result, the light emitting element of the bad pixel may emit light by driving the transistors of the repair pixel (or dummy pixel).

SUMMARY

However, a parasitic capacitance may be formed in the repair line. Therefore, when a low-grayscale data signal is supplied, the light emitting element of the repaired pixel (or bad pixel) does not emit light, corresponding to the low-grayscale data signal, but may be recognized as a dark spot. In addition, parasitic capacitances may be formed between the repair line and anode electrodes of light emitting elements of normal pixels (which have no defect) adjacent to the repair line. Therefore, the voltage of the repair line may be changed, and hence the light emitting element of the repaired pixel (or bad pixel) may erroneously emit light.

Embodiments provide a display device in which a light emitting element of a repaired pixel (or bad pixel) can normally emit light, corresponding to a data signal (or grayscale value) provided from a repair pixel (or dummy pixel).

In accordance with an aspect of the present disclosure, there is provided a display device including: a first transistor connected between a first power source and a second node, and including a gate electrode connected to a first node; a second transistor connected between a data line and the first node, and including a gate electrode connected to a first scan line; a fourth transistor connected between the second node and an initialization power source, and including a gate electrode connected to a third scan line; a fifth transistor connected between the first power source and the first transistor, and including a gate electrode connected to an emission control line; a storage capacitor connected between the first node and the second node; a repair line including a first end connected to the second node; and a light emitting element of a bad pixel, which is connected between a second end of the repair line and a second power source, where the second end is opposite to the first end.

The display device further includes a sixth transistor including a first electrode connected to the second node, a second electrode connected to the first end of the repair line, and a gate electrode connected to the emission control line.

During a period in which the fourth transistor is turned on, the sixth transistor may be turned off.

The display device may further include a first parasitic capacitor connected between an anode and a cathode of the light emitting element of the bad pixel.

The display device may further include an auxiliary capacitor including a first electrode connected to the second node and a second electrode connected to a DC power source.

The second electrode of the auxiliary capacitor may be connected to any one of the first power source, the second power source, and the initialization power source.

A capacitance of the auxiliary capacitor may be substantially equal to a capacitance of the first parasitic capacitor.

The display device may further include a hold capacitor connected between the first power source and the second node.

A capacitance of the hold capacitor may be greater than a capacitance of the first parasitic capacitor.

The display device may further include: a seventh transistor connected between the second electrode of the sixth transistor and the initialization power source, and including a gate electrode connected to the emission control line; an eighth transistor connected between the seventh transistor and the initialization power source, and including a gate electrode connected to the third scan line; and a compensation capacitor connected between the first power source and a common node connecting the seventh transistor and the eighth transistor.

During a period in which the eighth transistor is turned on, the seventh transistor may be turned off.

A capacitance of the compensation capacitor may be substantially equal to a capacitance of the first parasitic capacitor connected between the anode and the cathode of the light emitting element of the bad pixel.

The display device may further include a third transistor connected between the first node and a reference power source, and including a gate electrode connected to a second scan line.

Each of the first to sixth transistors may be an N-channel metal oxide semiconductor ("NMOS") transistor.

In accordance with another aspect of the present disclosure, there is provided a display device including: a first transistor connected between a first power source and a third node, and including a gate electrode connected to a first node; a second transistor connected between a data line and the third node, and including a gate electrode connected to a first scan line; a fifth transistor connected between the first power source and the first transistor, and including a gate electrode connected to an emission control line; a sixth transistor connected between the third node and a second node, and including a gate electrode connected to the emission control line; a seventh transistor connected between the second node and an initialization power source, and including a gate electrode connected to a third scan line; a storage capacitor connected between the first node and the second node; a repair line including a first end connected to the second node; and a light emitting element of a bad pixel, which is connected between a second end of the repair line and a second power source, where the second end is opposite to the first end.

The display device further includes an eighth transistor including a first electrode connected to the second node, a second electrode connected to the first end of the repair line, and a gate electrode connected to the emission control line.

During a period in which the seventh transistor is turned on, the eighth transistor may be turned off.

The display device may further include a first parasitic capacitor connected between an anode and a cathode of the light emitting element of the bad pixel.

The display device may further include an auxiliary capacitor including a first electrode connected to the second node and a second electrode connected to a DC power source.

The second electrode of the auxiliary capacitor may be connected to any one of the first power source, the second power source, and the initialization power source.

A capacitance of the auxiliary capacitor may be substantially equal to a capacitance of the first parasitic capacitor.

The display device may further include: a third transistor connected between the first node and a common node connecting the first transistor and the fifth transistor, and including a gate electrode connected to the first scan line; and a fourth transistor connected between a reference power source and the first node, and including a gate electrode connected to a second scan line.

In accordance with still another aspect of the present disclosure, there is provided a display device including: a display panel including a display area including pixels and a non-display area including a dummy pixel; a scan driver which supplies a scan signal to the display panel; a data driver which supplies a data signal to the display panel; and a timing controller which supplies a first control signal for controlling the scan driver and a second control signal for controlling the data driver.

The dummy pixel is connected to a bad pixel among the pixels in the display area through a repair line, and a connection of the dummy pixel to the repair line may be cut off in an initialization phase in which a voltage of an initialization power source is supplied.

The dummy pixel may include: a first transistor connected between a first power source and a second node, and including a gate electrode connected to a first node; a second transistor connected between a data line and the first node, and including a gate electrode connected to a first scan line; a fourth transistor connected between the second node and the initialization power source, and including a gate electrode connected to a third scan line; a fifth transistor connected between the first power source and the first transistor, and including a gate electrode connected to an emission control line; a storage capacitor connected between the first node and the second node; and a sixth transistor including a first electrode connected to the second node, a second electrode connected to a first end of the repair line, and a gate electrode connected to the emission control line.

The bad pixel may include a light emitting element connected between a second end of the repair line and a second power source, and the second end is opposite to the first end.

During a period in which the fourth transistor is turned on, the sixth transistor may be turned off.

The display device may further include a first parasitic capacitor connected between an anode and a cathode of the light emitting element of the bad pixel.

The display device may further include an auxiliary capacitor including a first electrode connected to the second node and a second electrode connected to a DC power source.

The second electrode of the auxiliary capacitor may be connected to any one of the first power source, the second power source, and the initialization power source.

A capacitance of the auxiliary capacitor may be substantially equal to a capacitance of the first parasitic capacitor.

In accordance with still another aspect of the present disclosure, there is provided a display device including normal pixels and a bad pixel in a display area, and a dummy pixel in a non-display area. The dummy pixel is connected to the bad pixel through a repair line, a first normal pixel disposed adjacent to the repair line among the normal pixels forms a second parasitic capacitor with the repair line, and a connection of the dummy pixel to the repair line is cut off in an initialization phase in which a voltage of an initialization power source is supplied.

The first normal pixel may include a first light emitting element connected between a first power source and a second power source. The bad pixel may include a second light emitting element connected between an end of the repair line and the second power source. The second parasitic capacitor may be formed between an anode of the first light emitting element and an anode of the second light emitting element.

In accordance with still another aspect of the present disclosure, there is provided an electronic device including: a display device which displays an image in a display area; a communication unit which performs communication with an external device; and a motion sensing unit which senses a motion including a rotational direction, an angle, or an inclination.

The display device includes normal pixels and a bad pixel in a display area, and a dummy pixel in a non-display area. The dummy pixel is connected to the bad pixel through a repair line. A first normal pixel disposed adjacent to the repair line among the normal pixels forms a second parasitic capacitor with the repair line. A connection of the dummy pixel to the repair line is cut off in an initialization phase in which a voltage of an initialization power source is supplied.

The communication unit may include at least one of a WiFi chip, a Bluetooth chip, a wireless communication chip, and an NFC chip.

The motion sensing unit may include at least one of a geometric sensor, a gyro sensor, and an acceleration sensor.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being “between” two elements, it can be the only element between the two elements, or one or more intervening elements may also be present. Like reference numerals refer to like elements throughout.

DETAILED DESCRIPTION

Figure 1:
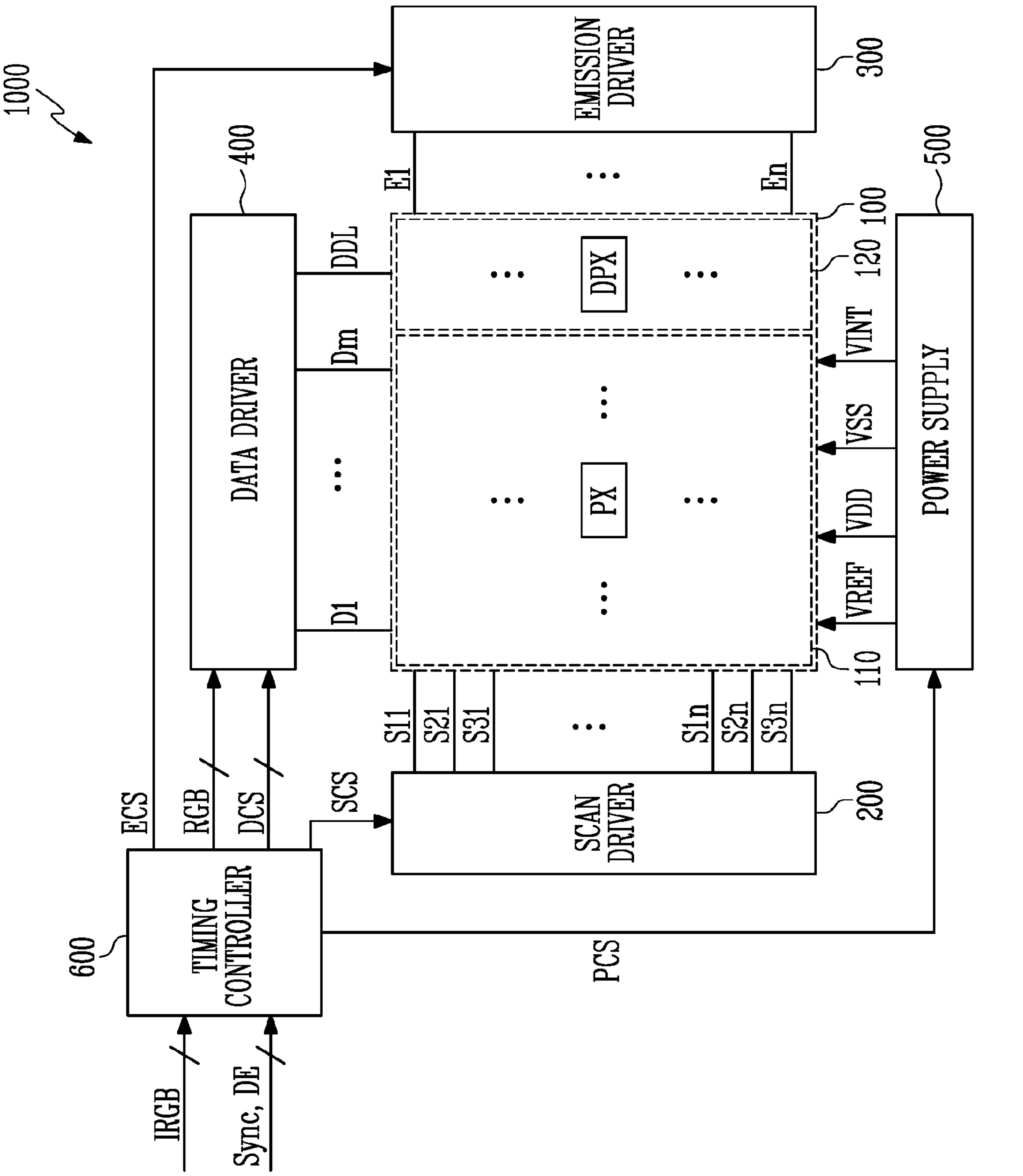
FIG. 1 is a block diagram illustrating a display device in accordance with embodiments of the present disclosure.

Hereinafter, exemplary embodiments are described in detail with reference to the accompanying drawings so that those skilled in the art may easily practice the present disclosure. The present disclosure may be implemented in various different forms and is not limited to the exemplary embodiments described in the present specification.

A part irrelevant to the description will be omitted to clearly describe the present disclosure, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present disclosure is not limited thereto. Thicknesses of several portions and regions are exaggerated for clear expressions.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected to" another element, it can be directly connected to the other element or intervening elements may be present therebetween. In contrast, when an element is referred to as being "directly connected to" another element, there are no intervening elements present.

In description, the expression "equal" may mean "substantially equal." That is, this may mean equality to a degree to which those skilled in the art can understand the equality. Other expressions may be expressions in which "substantially" is omitted.

FIG. 1 is a block diagram illustrating a display device in accordance with embodiments of the present disclosure.

Referring to FIG. 1, the display device 1000 may include a display panel 100, a scan driver 200, an emission driver 300, a data driver 400, a power supply 500, and a timing controller 600.

The display panel 100 may include scan lines S11 to S1*n*, S21 to S2*n*, and S31 to S3*n*, emission control lines E1 to En, data lines D1 to Dm, and a dummy data line DDL.

The display panel 100 may include a display area 110 and a dummy area 120. The dummy area 120 may be a non-display area. The display area 110 may include pixels PX connected to the scan lines S11 to S1*n*, S21 to S2*n*, and S31 to S3*n*, the emission control lines E1 to En, and the data lines D1 to Dm (m and n are integers greater than 1). The dummy area 120 may include dummy pixels DPX connected to the scan lines S11 to S1*n*, S21 to S2*n*, and S31 to S3*n*, the emission control lines E1 to En, and the dummy data line DDL (n is an integer greater than 1).

Each of the pixels PX may include a driving transistor and a plurality of switching transistors. The pixels PX may be supplied with voltages of a first power source VDD, a second power source VSS, a reference power source VREF, and an initialization power source VINT from the power supply 500. Each of the pixels PX may be supplied with a data signal (or data voltage) through the data lines D1 to Dm. Signal lines connected to the pixel PX may be variously set corresponding to a circuit structure of the pixel PX.

Figure 3:
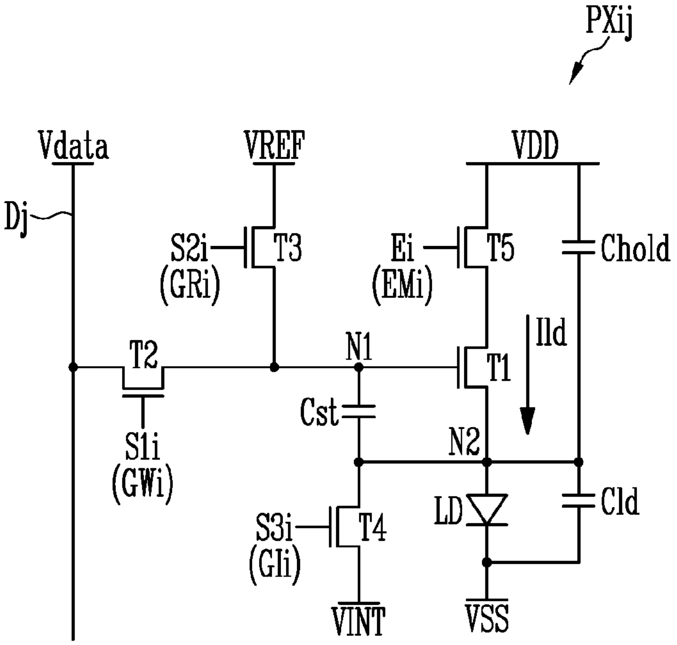
FIG. 3 is a circuit diagram illustrating an embodiment of a pixel shown in FIG. 1.

Each of the dummy pixels DPX may be substantially identical to the pixel PX, except a light emitting element (LD shown in FIG. 3). The dummy pixels DPX may be arranged along an extending direction of the dummy data line DDL. The dummy pixel DPX may be supplied with a data signal supplied to a bad pixel (BPX shown in FIG. 6) disposed on the same pixel row among the pixels PX disposed in the display area 110 through the dummy data line DDL. As used herein, the "bad pixel" is defined as a pixel that has a defect therein.

The timing controller 600 may be supplied with input image data IRGB and control signals Sync and DE from a host system such as an Application Processor ("AP") through a predetermined interface.

The timing controller 600 may generate a first control signal SCS, a second control signal ECS, a third control signal DCS, and a fourth control signal PCS, based on the input image data IRGB, a synchronization signal Sync (e.g., a vertical synchronization signal, a horizontal synchronization signal, etc.), a data-enable signal DE, a clock signal, and the like. The first control signal SCS may be supplied to the scan driver 200, the second control signal ECS may be supplied to the emission driver 300, the third control signal DCS may be supplied to the data driver 400, and the fourth control signal PCS may be supplied to the power supply 500. The timing controller 600 may realign the input image data IRGB and supply the realigned image data to the data driver 400.

The scan driver 200 may receive the first control signal SCS from the timing controller 600, and supply a first scan signal, a second scan signal, and a third scan signal respectively to first scan lines S11 to S1*n*, second scan lines S21 to S2*n*, and third scan lines S31 to S3*n*, based on the first control signal SCS.

The first to third scan signals may be set to a gate-on voltage corresponding to a type of transistors to which the corresponding scan signals are supplied. A transistor receiving a scan signal may be set to a turn-on state when the scan signal is supplied. For example, the gate-on voltage of a scan signal supplied to a P-channel metal oxide semiconductor ("PMOS") transistor may have a logic low level, and the gate-on voltage of a scan signal supplied to an N-channel metal oxide semiconductor (NMOS) transistor may have a logic high level.

The emission driver 300 may supply an emission control signal to the emission control lines E1 to En, based on the second control signal ECS. For example, the emission control signal may be sequentially supplied to the emission control lines E1 to En.

The emission control signal may be set to a gate-off voltage.

A transistor receiving the emission control signal may be turned off when the emission control signal is supplied, and be set to the turn-on state in other cases.

For convenience of description, a case where the scan driver 200 and the emission driver 300 are components separate from each other has been illustrated in FIG. 1, but the present disclosure is not limited thereto. The scan driver 200 may include a plurality of scan drivers, each of which supplies at least one of the first to third scan signals, according to a design. In addition, at least a portion of the scan driver 200 and the emission driver 300 may be integrated as one driving circuit, one module, or the like.

The data driver 400 may receive the third control signal DCS and image data RGB from the timing controller 600. The data driver 400 may convert the image data RGB in a digital form into an analog data signal (or data voltage).

The data driver 400 may supply a data signal (or data voltage) to the data lines D1 to Dm, corresponding to the third control signal DCS. The data signal (or data voltage) supplied to the data lines D1 to Dm may be supplied to be synchronized with the first scan signal supplied to the first scan lines S11 to S1*n*.

The power supply 500 may supply, to the display panel 100, the voltage of the first power source VDD and the voltage of the second power source VSS, which are used to driving the pixel PX. A voltage level of the second power source VSS may be lower than a voltage level of the first power source VDD. For example, the voltage of the first power source VDD may be a positive voltage, and the voltage of the second power source VSS may be a negative voltage.

The power supply 500 may supply the voltage of the reference power source VREF to the display panel 100. In accordance with an embodiment, the voltage of the reference power source VREF may be a positive voltage. For example, the voltage of the reference power source VREF may be 5 [V].

The power supply 500 may supply the voltage of the initialization power source VINT to the display panel 100. The initialization power source VINT may be a power source for initializing the pixel PX. For example, a driving transistor and/or a light emitting element, included in the pixel PX, may be initialized by the voltage of the initialization power source VINT.

Figure 2:
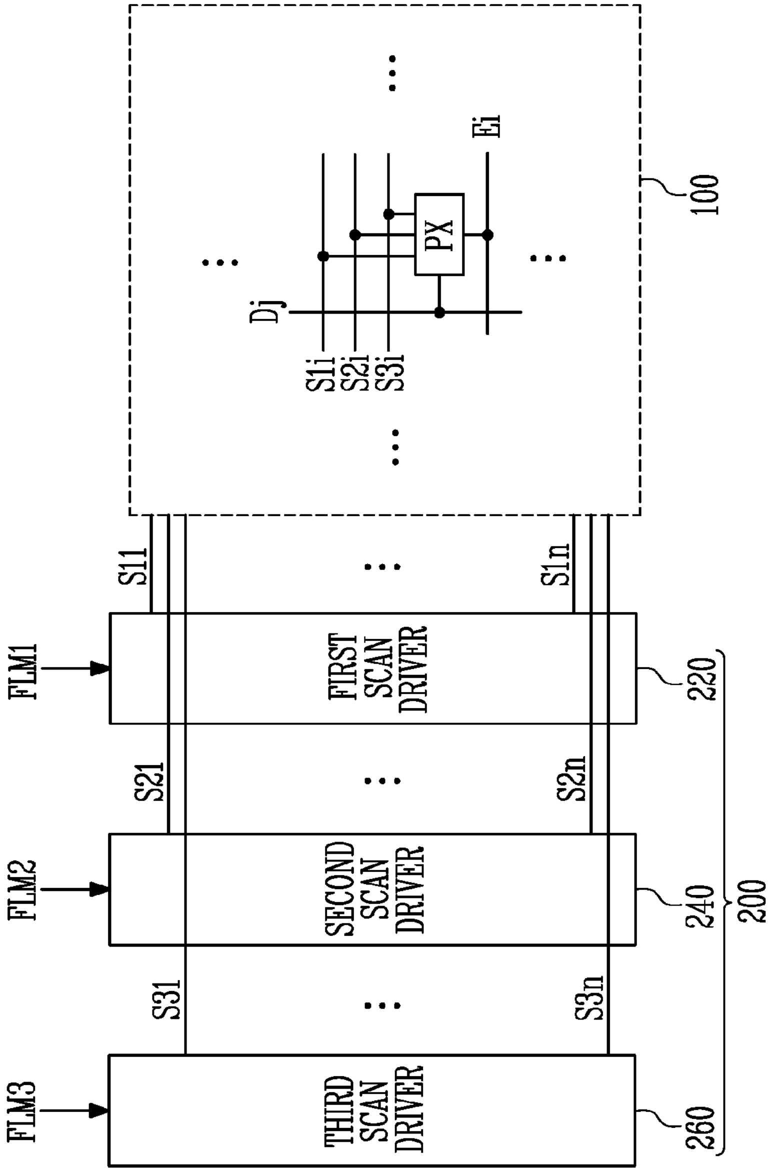
FIG. 2 is a diagram illustrating an example of a scan driver included in the display device shown in FIG. 1.

FIG. 2 is a diagram illustrating an example of the scan driver included in the display device shown in FIG. 1.

Referring to FIGS. 1 and 2, the scan driver 200 may include a first scan driver 220, a second scan driver 240, and a third scan driver 260.

The first control signal SCS may include first to third scan start signals FLM1 to FLM3. The first to third scan start signals FLM1 to FLM3 may be respectively supplied to the first to third scan drivers 220, 240, and 260.

A width, a supply timing, and the like of each of the first to third scan start signals FLM1 to FLM3 may be determined according to a driving condition of the pixel PX and a frame frequency. The first to third scan signals may be respectively output based on the first to third scan start signals FLM1 to FLM3. For example, a signal width of at least one of the first to third scan signals may be different from that of the others.

The first scan driver 220 may sequentially supply the first scan signal to the first scan lines S11 to S1*n* in response to the first scan start signal FLM1. The second scan driver 240 may sequentially supply the second scan signal to the second scan lines S21 to Stn in response to the second scan start signal FLM2. The third scan driver 260 may sequentially supply the third scan signal to the third scan lines S31 to S3*n* in response to the third scan start signal FLM3.

FIG. 3 is a circuit diagram illustrating an embodiment of the pixel shown in FIG. 1. For convenience of description, a pixel PXij connected to a j-th data line Dj and i-th scan lines S1*i*, S2*i*, and S3*i* will be illustrated in FIG. 3 (i is a natural number equal to or smaller than n, and j is a natural number equal to or smaller than m).

The pixel PXij may be connected to the j-th data line Dj, a 1i-th scan line S1*i*, a 2i-th scan line S2*i*, a 3i-th scan line S3*i*, and an i-th emission control line Ei.

Referring to FIG. 3, the pixel PXij in accordance with the embodiment of the present disclosure may include a first transistor T1, a second transistor T2, a third transistor T3, a fourth transistor T4, a fifth transistor T5, a storage capacitor Cst, a hold capacitor Chold, and a light emitting element LD. A first parasitic capacitor Cld may exist in the light emitting element LD.

The first transistor T1 may be connected between the first power source VDD and a second node N2. For example, a first electrode of the first transistor T1 may be connected to the first power source VDD via the fifth transistor T5, a second electrode of the first transistor T1 may be connected to the second node N2, and a gate electrode of the first transistor T1 may be connected to a first node N1.

In accordance with an embodiment, the first transistor T1 may further include a bottom gate (not shown) so as to improve an operating characteristic of the first transistor T1. For example, the bottom gate may be connected to a common node connecting the hold capacitor Chold and the first parasitic capacitor Cld of the light emitting element LD.

The first transistor T1 may serve as a driving transistor for supplying a driving current to the light emitting element LD. For example, the first transistor T1 may supply, to the light emitting element LD, a driving current corresponding to a voltage stored in the storage capacitor Cst.

The second transistor T2 may be connected between the j-th data line Dj and the first node N1. For example, a first electrode of the second transistor T2 may be connected to the j-th data line Dj, a second electrode of the second transistor T2 may be connected to the first node N1, and a gate electrode of the second transistor T2 may be connected to the 1i-th scan line S1*i*.

Accordingly, the second transistor T2 may be turned on in response to a first scan signal GWi supplied to the 1i-th scan line S1*i*. When the second transistor T2 is turned on, a data signal of the j-th data line Dj may be transferred to the first node N1.

The third transistor T3 may be connected between the reference power source VREF and the first node N1. For example, a first electrode of the third transistor T3 may be connected to the reference power source VREF, a second electrode of the third transistor T3 may be connected to the first node N1, and a gate electrode of the third transistor T3 may be connected to the 2i-th scan line S2*i*.

Accordingly, the third transistor T3 may be turned on in response to a second scan signal GRi supplied to the 2i-th scan line S2*i*. When the third transistor T3 is turned on, the voltage of the reference power source VREF may be transferred to the first node N1.

The fourth transistor T4 may be connected between the second node N2 and the initialization power source VINT. For example, a first electrode of the fourth transistor T4 may be connected to the second node N2, a second electrode of the fourth transistor T4 may be connected to the initialization power source VINT, and a gate electrode of the fourth transistor T4 may be connected to the 3i-th scan line S3*i*.

Accordingly, the fourth transistor T4 may be turned on in response to a third scan signal GIi supplied to the 3i-th scan line S3*i*. When the fourth transistor T4 is turned on, the voltage of the initialization power source VINT may be transferred to the second node N2.

The fifth transistor T5 may be connected between the first power source VDD and the first transistor T1. For example, a first electrode of the fifth transistor T5 may be connected to the first power source VDD, a second electrode of the fifth transistor T5 may be connected to the first electrode of the first transistor T1, and a gate electrode of the fifth transistor T5 may be connected to the i-th emission control line Ei.

Accordingly, the fifth transistor T5 may be turned off in response to an emission control signal EMi supplied to the i-th emission control line Ei.

The first electrode of each of the transistors T1, T2, T3, T4, and T5 may be set as a source electrode or a drain electrode, and the second electrode of each of the transistors T1, T2, T3, T4, and T5 may be set as an electrode different from the first electrode. For example, when the first electrode is set as the drain electrode, the second electrode may be set as the source electrode.

The transistors T1, T2, T3, T4, and T5 included in the pixel PXij may all have the same channel type. For example, each of the first to fifth transistors T1, T2, T3, T4, and T5 may be set to have an n-channel type.

The storage capacitor Cst may be connected between the first node N1 and the second node N2. For example, a first electrode of the storage capacitor Cst may be connected to the first node N1, and a second electrode of the storage capacitor Cst may be connected to the second node N2. A voltage corresponding to the data signal may be stored in the storage capacitor Cst.

The hold capacitor Chold may be connected between the first power source VDD and the second node N2. For example, a first electrode of the hold capacitor Chold may be connected to the first power source VDD, and a second electrode of the hold capacitor Chold may be connected to the second node N2.

The first parasitic capacitor Cld may be connected between the second node N2 and the second power source VSS. For example, a first electrode of the first parasitic capacitor Cld may be connected to the second node N2, and a second electrode of the first parasitic capacitor Cld may be connected to the second power source VSS.

The light emitting element LD may be connected between the second node N2 and the second power source VSS. For example, an anode electrode of the light emitting element LD may be connected to the second node N2, and a cathode electrode of the light emitting element LD may be connected to the second power source VSS. The light emitting element LD may be supplied with a driving current from the first transistor T1, and emit light with a luminance corresponding to the driving current.

The light emitting element LD may be selected as an organic light emitting diode. Also, the light emitting element LD may be selected as an inorganic light emitting diode such as a micro light emitting diode ("LED") or a quantum dot light emitting diode. Also, the light emitting element LD may be an element configured with a combination of an organic material and an inorganic material.

A light control part (not shown) may be disposed on the light emitting element LD. The light control part may change the wavelength of light provided from the light emitting element LD. In accordance with an embodiment, the light control part may include a color conversion part for changing the wavelength of light and a color filter part for allowing light having a specific wavelength to be transmitted therethrough.

In FIG. 2, it is illustrated that the pixel PXij includes a single light emitting element LD. However, in another embodiment, the pixel PXij may include a plurality of light emitting elements, and the plurality of light emitting elements may be connected in series, parallel, or series/parallel to each other.

Figure 4:
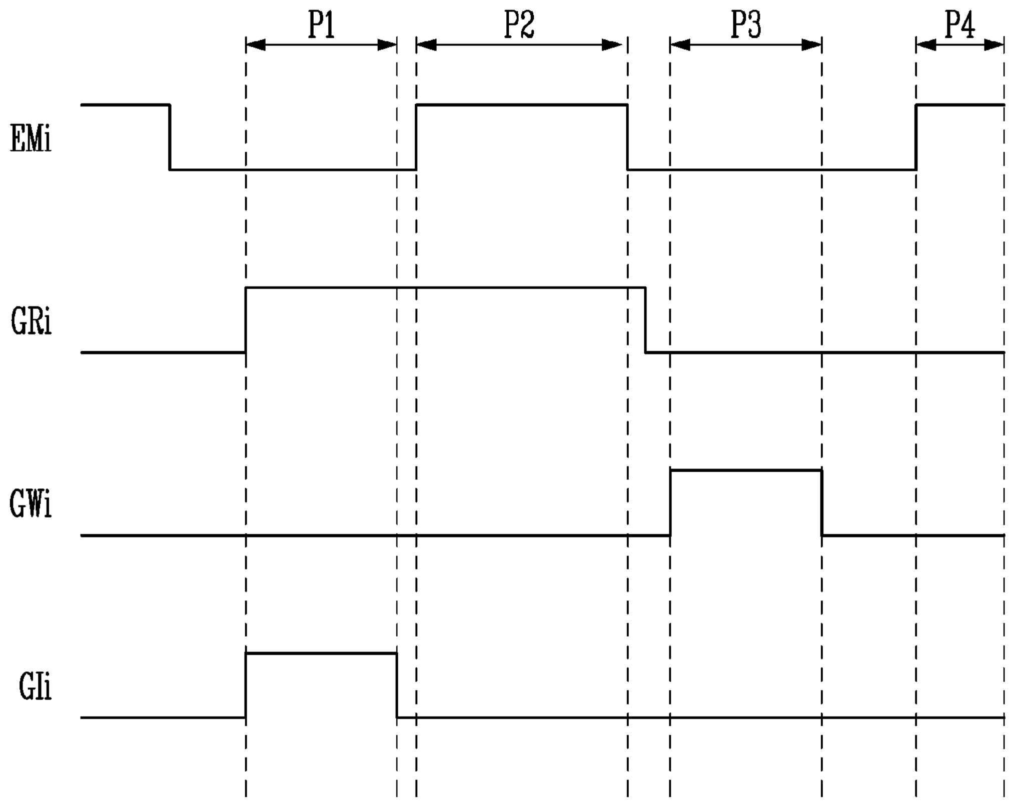
FIG. 4 is a diagram illustrating driving waveforms of signals supplied to the pixel shown in FIG. 3.

FIG. 4 is a diagram illustrating driving waveforms of signals supplied to the pixel shown in FIG. 3.

Referring to FIGS. 3 and 4, a driving method of the pixel PXij in accordance with the embodiment of the present disclosure may include an initialization phase, a threshold voltage compensation phase, a data writing phase, and a light emission phase.

The initialization phase may be performed during a first period P1. In the initialization phase, the voltage of the initialization power source VINT may be supplied to the second node N2 by turning on the fourth transistor T4. To this end, the third scan signal GIi may be supplied to the 3i-th scan line S3*i* during the first period P1.

Also, in the initialization phase, the voltage of the reference power source VREF may be supplied to the first node N1 by turning on the third transistor T3 together with the fourth transistor T4. To this end, the second scan signal GRi may also be supplied to the 2i-th scan line S2*i* during the first period P1.

Also, in the initialization phase, the supply of the voltage of the first power source VDD to the first transistor T1 may be blocked by turning off the fifth transistor T5. To this end, the emission control signal EMi may be supplied to the i-th emission control line Ei during the first period P1.

Through the above-described initialization operation, the pixel PXij may be initialized not to be influenced by a previous unit period.

Voltages of the first node N1 and the second node may be represented as shown in the following Equation 1.

$$VN1=VREF$$

$$VN2=VINT \qquad \text{Equation 1}$$

VN1 denotes the voltage of the first node N1, VREF denotes the voltage of the reference power source, VN2 denotes the voltage of the second node N2, and VINT denotes the voltage of the initialization power source.

The threshold voltage compensation phase may be performed during a second period P2. In the threshold voltage compensation phase, a threshold voltage of the first transistor T1 may be stored in the storage capacitor Cst by turning on the third transistor T3 and the fifth transistor T5.

To this end, the second scan signal GRi and the emission control signal EMi may be respectively supplied to the 2i-th scan line S2*i* and the i-th emission control line Ei during the second period P2.

Accordingly, during the second period P2, the third transistor T3 and the fifth transistor T5 may maintain an on-state, and the first transistor T1, the second transistor T2, and the fourth transistor T4 may maintain an off-state.

During the second period P2, the voltage of the first node N1 may continuously maintain the voltage of the reference power source VREF, and the voltage of the second node N2 may be changed from the voltage of the initialization power source VINT1 to a value obtained by subtracting the threshold voltage of the first transistor T1 from the voltage of the reference power source VREF.

The voltages of the first node N1 and the second node N2 may be represented as shown in the following Equation 2.

$$VN1=VREF$$

$$VN2=VREF-Vth \qquad \text{Equation 2}$$

VN1 denotes the voltage of the first node N1, VREF denotes the voltage of the reference power source, VN2 denotes the voltage of the second node N2, and Vth denotes the threshold voltage of the first transistor T1.

In order to maintain the light emitting element LD in a non-emission state during the threshold voltage compensation phase, the voltage of the second node N2, i.e., the voltage of the reference power source VREF may be set to a voltage level at which the light emitting element LD can be maintained in the non-emission state.

A time for which the threshold voltage compensation phase is performed may be determined by the second scan signal GRi supplied to the 2i-th scan line S2*i* and the emission control signal EMi supplied to the i-th emission control line Ei.

Thus, a width of the second scan signal GRi supplied to the 2i-th scan line S2*i* and a width of the emission control signal EMi supplied to the i-th emission control line Ei are adjusted, so that the time for which the threshold voltage compensation phase is performed can be adjusted.

The data writing phase may be performed during a third period P3. In the data writing phase, a data signal may be supplied to the first node N1 by turning on the second transistor T2.

Therefore, in the data writing phase, the data signal transferred from the j-th data line Dj may be supplied to the gate electrode of the first transistor T1.

To this end, the first scan signal GWi may be supplied to the 1i-th scan line S1*i* during the third period P3. Accordingly, during the third period P3, the first transistor T1 may maintain the on-state, and the third transistor T3, the fourth transistor T4, and the fifth transistor T5 may maintain the off-state.

The voltage of the first node N2 may be maintained as a voltage of the data signal (hereinafter, referred to as a data voltage) during the third period P3, and the voltage of the second node N2 during the third period P3 may be represented as shown in the following Equation 3.

$$VN1=Vdata$$

$$VN2=VREF-Vth \qquad \text{Equation 3}$$

VN1 denotes the voltage of the first node N1, Vdata denotes the data voltage, VREF denotes the voltage of the reference power source, VN2 denotes the voltage of the second node N2, and Vth denotes the threshold voltage of the first transistor T1.

Additionally, for convenience of description, a case where the voltage of the second node N2 maintains a voltage VREF-Vth during the third period P3 has been described in Equation 3, but the present disclosure is not limited thereto.

In an example, during the third period P3, the voltage of the first node N1 may be changed from the voltage of the reference power source VREF to the data voltage Vdata, and the voltage of the second node N2 may be changed corresponding to a voltage variation of the first node N1 by coupling of the storage capacitor Cst. However, in the embodiment of the present disclosure, a capacitance of the hold capacitor Chold may be set greater than a capacitance of the storage capacitor Cst, and accordingly, a voltage variation of the second node N2 can be minimized during the third period P3. Subsequently, for convenience of description, it is assumed that the second node N2 maintains the voltage VREF-Vth during the third period P3.

Finally, the light emission phase may be performed during a fourth period P4. In the light emission phase, a driving current corresponding to the voltage stored in the storage capacitor Cst may be supplied to the light emitting element LD from the first transistor T1.

To this end, the scan signals GWi, GRi, and GIi are not supplied to the 1i-th, 2i-th, and 3i-th scan lines S1*i*, S2*i*, and S3*i* during the fourth period P4. The emission control signal EMi is not supplied to the i-th emission control line Ei. In other words, the fifth transistor T5 may be turned on.

Accordingly, the second transistor T2, the third transistor T3, and the fourth transistor T4 may maintain the off-state.

Voltages according to the following Equation 4 may be stored in the first node N1 and the second node N2, respectively, during the fourth period P4, and accordingly, the first transistor T1 may supply a driving current according to the following Equation 4 to the light emitting element LD.

$$VN1 = V\text{data} + (Vld - VREF + Vth) \qquad \text{Equation 4}$$

$$VN2 = V|d$$

-continued $$Ild = k \times \left( \frac{Cst}{Cst + Chold + Ctd} \times (Vgs - Vth) \right)^2 = k \times \left( \frac{Cst}{Cst + Chold + Ctd} \times (Vdata - VREF) \right)^2$$

VN1 denotes the voltage of the first node N1, Vdata denotes the data voltage, Vld denotes the voltage of the second node N2, VREF denotes the voltage of the reference power source, Vth denotes the threshold voltage of the first transistor, VN2 denotes the voltage of the second node N2, Ild denotes the driving current output from the first transistor T1, k denotes a constant, Vgs denotes a gate-source voltage of the first transistor T1 (here, Vgs is equal to VN1-VN2), Cst denotes the capacitance of the storage capacitor, Chold denotes the capacitance of the hold capacitor, and Cld denotes a capacitance of the light emitting element.

As can be seen in Equation 4, the driving current output from the first transistor T1 is determined regardless of the threshold voltage Vth, and thus a luminance non-uniformity phenomenon due to a threshold voltage deviation of the driving transistor, i.e., the first transistor T1 included in each pixel PXij can be eliminated.

Next, a repair method in an organic light emitting display device in accordance with an embodiment of the present disclosure will be described with reference to FIGS. 5 and 6.

Figure 5:
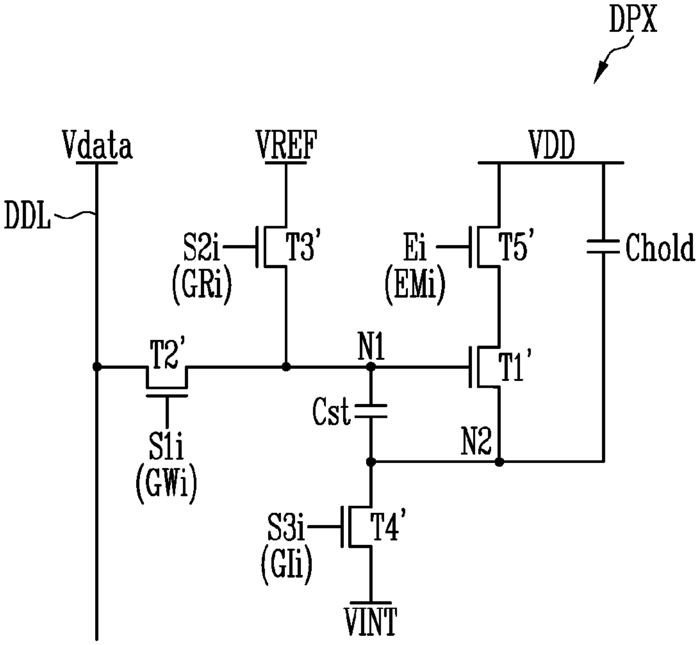
FIG. 5 is an equivalent circuit diagram exemplifying a dummy pixel of the display device in accordance with an embodiment of the present disclosure.

FIG. 5 is an equivalent circuit diagram exemplifying a dummy pixel of the display device in accordance with an embodiment of the present disclosure. FIG. 6 is a diagram exemplifying repair of a bad pixel in an organic light emitting display device in accordance with an embodiment of the present disclosure.

Referring to FIG. 5, the dummy pixel DPX connected to the i-th scan lines S1*i*, S2*i*, and S3*i* does not include the light emitting element LD, and may have a structure substantially identical to the pixel PXij, except that a first electrode of a second transistor T2' is connected to one end of the dummy data line DDL. The dummy pixel DPX may include first to fifth transistors T1', T2', T3', T4', and T5', a storage capacitor Cst, and a hold capacitor Chold.

The connection relationship of the first to fifth transistors T1', T2, T3, T4, and T5, the storage capacitor Cst, and the hold capacitor Chold, except the connection relationship of the first electrode of the second transistor T2', may be identical to that of the first to fifth transistors T1, T2, T3, T4, and T5, the storage capacitor Cst, and the hold capacitor Chold of the pixel PXij shown in FIG. 3.

Figure 6:
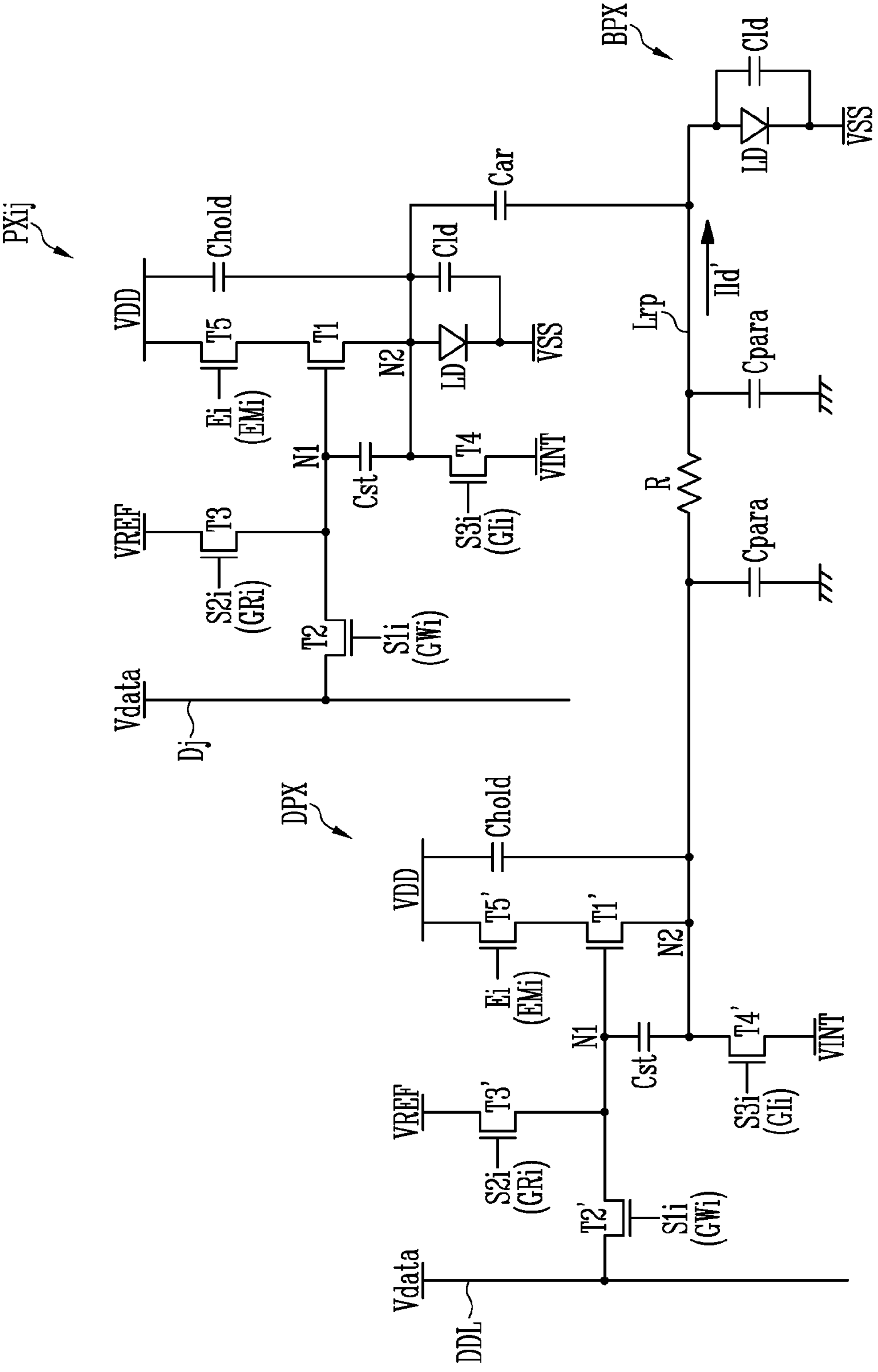
FIG. 6 is a diagram exemplifying repair of a bad pixel in an organic light emitting display device in accordance with an embodiment of the present disclosure.

Referring to FIG. 6, for example, when a defect occurs in a pixel BPX (i.e., bad pixel) connected to the i-th scan lines S1*i*, S2*i*, and S3*i* and a (j+1)th data line Dj+1 (not shown), a line between an anode of a light emitting element LD of the bad pixel BPX and first and fourth transistors T1 and T4 of the bad pixel BPX may be cut off, and the anode of the light emitting element LD of the bad pixel BPX and a second node N2 between the first and fourth transistors T1' and T4' of the dummy pixel DPX may be connected to each other through a repair line Lrp by using laser. Even though the pad pixel BPX has the same structure as that of the pixel PXij, other elements in the structure except for the light emitting element LD and the first parasitic capacitor Cld are omitted in FIGS. 6-9 and 11. In addition, a data signal supplied from the data line Dj+1 is transferred to the dummy data line DDL. Then, light may be normally emitted from the light emitting element LD of the bad pixel BPX by a current transferred from the driving transistor T1' of the dummy pixel DPX.

However, a line resistor R and a third parasitic capacitor Cpara may be formed in the repair line Lrp extending in an approximately row direction, which connects the light emitting element LD of the bad pixel BPX and the second node N2 of the dummy pixel DPX to each other, as shown in FIG. 6. As the third parasitic capacitor Cpara is formed, the first transistor T1' of the dummy pixel DPX may supply a current according to the following Equation 5 to the light emitting element LD of the bad pixel BPX.

$$Ild' = k \times \left( \frac{Cst}{Cst + C\text{hold} + Cld + Cpara} \times \frac{Cst}{Cst + C\text{hold} + Cld} \times (\mathrm{V}gs - \mathrm{V}th) \right)^2 = k \times \left( \frac{Cst}{Cst + C\text{hold} + Cld + Cpara} \times \frac{Cst}{Cst + C\text{hold} + Cld} \times (\mathrm{V}\ data - \mathrm{V}REF) \right)^2 \quad \text{Equation 5}$$

Vdata denotes a data voltage of the dummy pixel DPX, VREF denotes the voltage of the reference power source of the dummy pixel DPX, Vth denotes the threshold voltage of the first transistor T1, Ild' denotes a driving current output from the first transistor T1' of the dummy pixel DPX, k denotes a constant, Vgs denotes a gate-source voltage of the first transistor T1', Cst denotes the capacitance of the storage capacitor of the dummy pixel DPX, Chold denotes the capacitance of the hold capacitor of the dummy pixel DPX, Cld denotes the capacitance of the light emitting element LE of the bad pixel BPX, and Cpara denotes a capacitance of the third parasitic capacitor.

That is, the current Ild' flowing into the repaired pixel BPX (or the bad pixel) decreases as compared with the current Ild flowing into the normal pixel PXij, and therefore, the repaired pixel BPX (or the bad pixel) may emit light with a luminance lower than a target luminance. As used herein, the "normal pixel" is defined as a pixel that has no defect therein.

Moreover, in a process of initializing the second node N2 of the dummy pixel DPX to the voltage of the initialization power source VINT, the third parasitic capacitor Cpara formed in the repair line Lrp is also initialized. Therefore, when a data signal corresponding to a low grayscale is applied to the dummy pixel DPX, the current Ild' may be consumed to charge the third parasitic capacitor Cpara. As a result, the repaired pixel BPX (or the bad pixel) does not emit light, but may be recognized as a dark spot.

In addition, a second parasitic capacitor Car may be formed between anodes of light emitting elements LD of pixels PXij (or normal pixels) adjacent to the repair line Lrp extended in a row direction. As a voltage of the anode of the light emitting element LD of the normal pixel PXij is changed, a voltage of the anode of the repaired pixel BPX (or the bad pixel) is also changed due to a coupling phenomenon of the second parasitic capacitor Car, and therefore, the repaired pixel BPX (or the bad pixel) may erroneously emit light.

Figure 7:
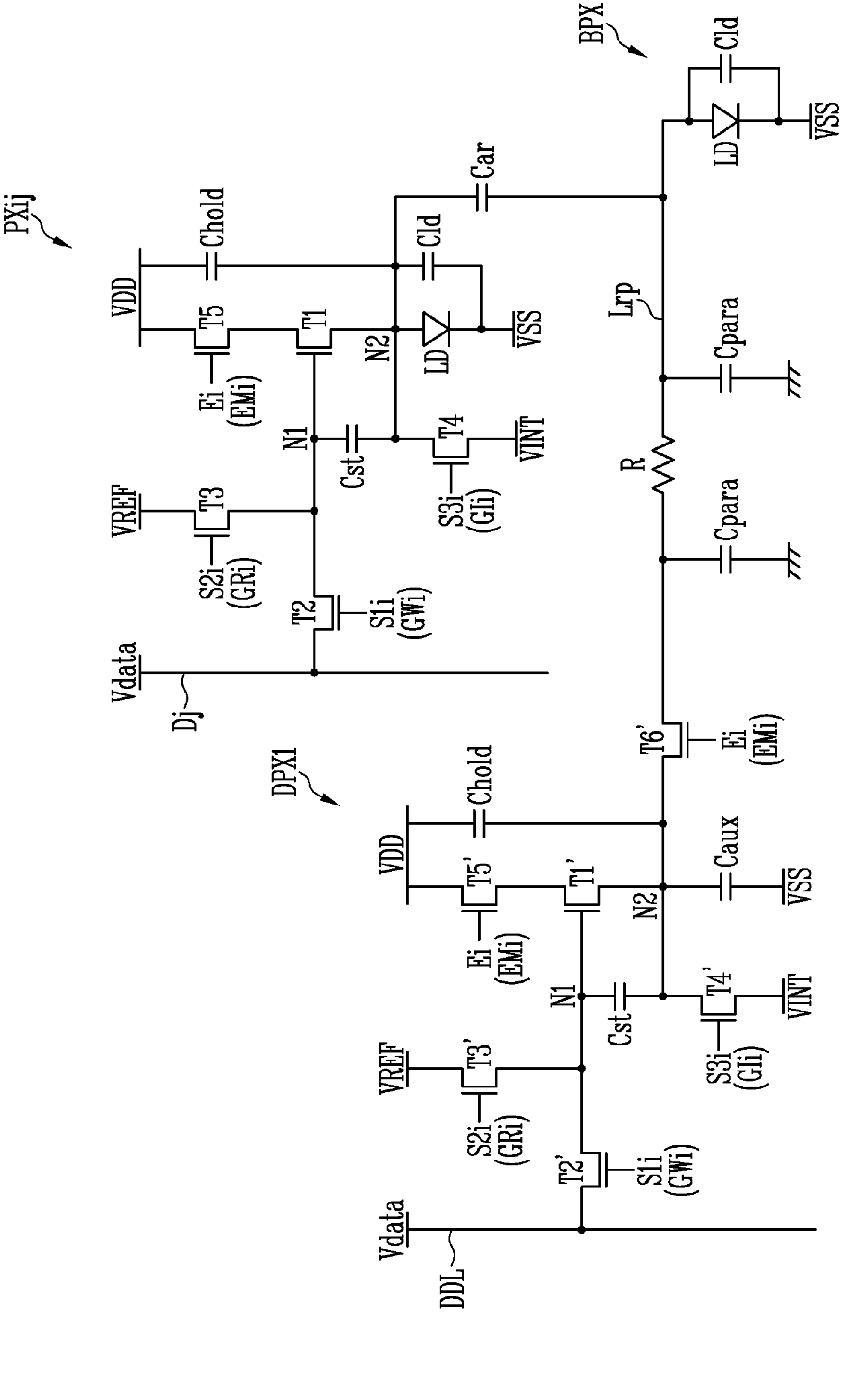
FIG. 7 is a diagram exemplifying repair of a bad pixel in the display device in accordance with an embodiment of the present disclosure.

FIG. 7 is a diagram exemplifying repair of a bad pixel in the display device in accordance with an embodiment of the present disclosure.

A dummy pixel DPX1 shown in FIG. 7 is different from the dummy pixel DPX shown in FIG. 6, in that the dummy pixel DPX1 further include a sixth transistor T6' and an auxiliary capacitor Caux.

Referring to FIGS. 4, 6, and 7, the sixth transistor T6' of the dummy pixel DPX1 may be connected between the second node N2 and one end of the repair line Lrp.

For example, a first electrode of the sixth transistor T6' may be connected to the second node N2, a second electrode of the sixth transistor T6' may be connected to the one end of the repair line Lrp, and a gate electrode of the sixth transistor T6' may be connected to the i-th emission control line Ei.

Accordingly, the sixth transistor T6' may be turned off in response to the emission control signal EMi supplied to the i-th emission control line Ei.

As shown in FIG. 4, the initialization phase may be performed during the first period P1. In the initialization phase, the fourth transistor T4' may be turned on to supply the voltage of the initialization power source VINT to the second node N2. To this end, the third scan signal GIi may be supplied to the 3i-th scan line S3*i* during the first period P1.

Also, in the initialization phase, the third transistor T3' may be turned on together with the fourth transistor T4', to supply the voltage of the reference power source VREF to the first node N1. To this end, the second scan signal GRi may also be supplied to the 2i-th scan line S2*i* during the first period P1.

Also, in the initialization phase, the fifth transistor T5' may be turned off, to block the supply of the voltage of the first power source VDD to the first transistor T1'. To this end, the emission control signal EMi may be supplied to the i-th emission control line Ei during the first period P1.

In the initialization phase, the sixth transistor T6' may be turned off together with the fifth transistor T5', to block connection between the second node N2 and the repair line Lrp. To this end, the emission control signal EMi may also be supplied to the i-th emission control line EMi during the first period P1.

When the sixth transistor T6' is turned off in a process of initializing the second node N2 of the dummy pixel DPX1 to the voltage of the initialization power source VINT, the connection between the second node N2 and the repair line Lrp is cut off, and therefore, the third parasitic capacitor Cpara formed in the repair line Lrp may not be initialized. When the third parasitic capacitor Cpara is not initialized, this results in an effect that the repair line Lrp is precharged. Thus, even when a data signal corresponding to a low grayscale of the dummy pixel DPX1 is applied, the current Ild' is not consumed to charge the third parasitic capacitor Cpara, and hence the repaired pixel BPX (or the bad pixel) is prevented from not emitting light. Accordingly, the repaired pixel BPX (or the bad pixel) can normally emit light with a target luminance.

When the connection between the second node N2 of the dummy pixel DPX1 and the repair line Lrp is cut off in the process of initializing the second node N2 to the voltage of the initialization power source VINT, the repair line Lrp may be changed to a floating state. When the repair line Lrp is changed to the floating state, the anode of the light emitting element LD of the repaired pixel BPX (or the bad pixel) may not be influenced by the voltage applied to the anode of the light emitting element LD of the normal pixel PXij.

Specifically, when the fifth transistor T5' is turned off by the emission control signal EMi, the voltage applied to the anode of the light emitting element LD of the normal pixel PXij may fall, and the potential of the repair line Lrp may also fall due to the coupling phenomenon of the second parasitic capacitor Car. When the fifth transistor T5' is turned on, the voltage applied to the anode of the light emitting element LD of the normal pixel PXij may rise, and the potential of the repair line Lrp may also rise due to the coupling phenomenon of the second parasitic capacitor Car. When the repair line Lrp is in the floating state, a falling coupling element formed in the repair line Lrp when the voltage applied to the anode of the light emitting element LD of the normal pixel PXij falls and a rising coupling element formed in the repair line Lrp when the voltage applied to the anode of the light emitting element LD of the normal pixel PXij rises may be cancelled.

On the other hand, When the connection between the second node N2 of the dummy pixel DPX1 and the repair line Lrp is not cut off in the process of initializing the second node N2 to the voltage of the initialization power source VINT, the falling coupling element formed in the repair line Lrp when the voltage applied to the anode of the light emitting element LD of the normal pixel PXij falls is eliminated by the voltage of the initialization power source VINT, but the rising coupling element formed in the repair line Lrp when the voltage applied to the anode of the light emitting element LD of the normal pixel PXij rises is maintained as it is. Therefore, the voltage applied to the anode of the light emitting element LD of the repaired pixel BPX (or the bad pixel) may be influenced by the coupling phenomenon.

For example, when a data signal corresponding to a full-white grayscale is applied to the normal pixel PXij, the potential of the repair line Lrp rises, and therefore, the repaired pixel BPX (or the bad pixel) may erroneously emit light with a luminance brighter than the target luminance. When a data signal corresponding to a full-black grayscale is applied to the normal pixel PXij, the potential of the repair line Lrp falls, and therefore, the repaired pixel BPX (or the bad pixel) may erroneously emit light with a luminance darker than the target luminance.

The auxiliary capacitor Caux of the dummy pixel DPX1 may be connected between the second node N2 and the second power source VSS. For example, a first electrode of the auxiliary capacitor Caux may be connected to the second node N2, and a second electrode of the auxiliary capacitor Caux may be connected to the second power source VSS. However, the connection relationship of the auxiliary capacitor Caux is not limited thereto. For example, the first electrode of the auxiliary capacitor Caux may be connected to the second node N2, and the second electrode of the auxiliary capacitor Caux may be connected to any one of the first power source VDD and the initialization power source VINT in another embodiment. The second power source VSS, the first power source VDD and the initialization power source VINT may be a direct current ("DC") power source.

In accordance with an embodiment, a capacitance of the auxiliary capacitor Caux may be substantially equal to a capacitance of the first parasitic capacitor Cld formed in the light emitting element LD of the normal pixel PXij.

Even when the second node N2 of the dummy pixel DPX1 and the repair line Lrp is cut off, it is desirable to initialize the second node N2 of the dummy pixel DPX1 (or the anode of the light emitting element LD). When the auxiliary capacitor Caux of which one electrode is connected to the second node N2 does not exist, the repair line Lrp is in a state in which the repair line Lrp is precharged, and therefore, the repaired pixel BPX (or the bad pixel) may emit light more brightly, in response to the same data signal, as compared with the normal pixel PXij.

Specifically, the light emitting element LD of the normal pixel PXij has a threshold voltage (e.g., 1.5 voltages (V) to 2V). When the anode of the light emitting element LD (or the second node N2) is initialized to the voltage (e.g., 0.5V to 1V) of the initialization power source VINT, which is lower than the threshold voltage, a portion of the driving current provided from the first transistor T1 may be consumed so as to reach the threshold voltage of the light emitting element LD. That is, the portion of the driving current provided from the first transistor T1 may be a non-emission current.

When the auxiliary capacitor Caux does not exist in the dummy pixel DPX1, the driving current provided from the first transistor T1' is not consumed as the non-emission current, and hence a larger amount of current is supplied to the repaired pixel BPX (or the bad pixel) which is precharged, as compared with the normal pixel PXij. Therefore, the repaired pixel BPX (or the bad pixel) may emit light more brightly. Accordingly, the auxiliary capacitor Caux having a capacitance substantially equal to a capacitance of the first parasitic capacitor Cld included in the normal pixel PXij is included in the dummy pixel DPX1, so that the repaired pixel BPX (or the bad pixel) can normally emit light.

Hereinafter, other embodiments will be described. In the following embodiments, components identical to those of the embodiment already described will be omitted or simplified, and portions different from those of the embodiment already described will be mainly described.

Figure 8:
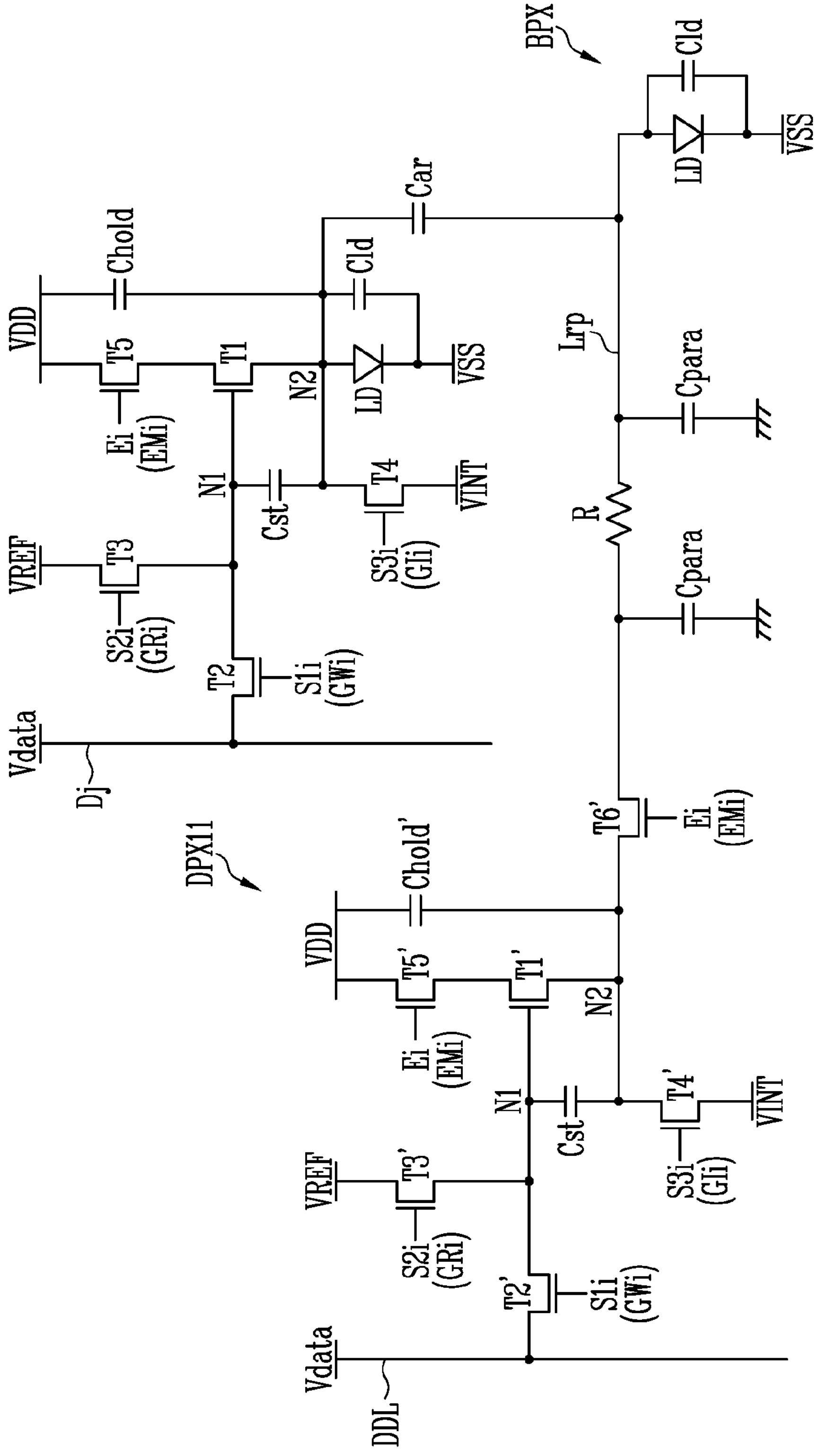
FIG. 8 is a diagram exemplifying repair of a bad pixel in the display device in accordance with another embodiment of the present disclosure.

FIG. 8 is a diagram exemplifying repair of a bad pixel in the display device in accordance with another embodiment of the present disclosure.

A dummy pixel DPX11 shown in FIG. 8 is different from the dummy pixel DPX1 shown in FIG. 7, in that the dummy pixel DPX11 does not include the auxiliary capacitor Caux and includes a hold capacitor Chold' having a changed capacitance. The configuration of the dummy pixel DPX11 except the hold capacitor Chold' is substantially identical to that of the dummy pixel DPX1 shown in FIG. 7. Therefore, overlapping descriptions will be omitted, and portions different from those of the dummy pixel DPX1 shown in FIG. 7 will be mainly described.

Referring to FIGS. 7 and 8, the dummy pixel DPX11 may to omit the auxiliary capacitor Caux disposed between the second node N2 and the second power source VSS.

Referring to the above-described Equation 4, the current Ild flowing via the first transistor T1' may be in proportion to the square of $$Cst/(Cst+Chold'+Cld)\frac{Cst}{Cst+Chold+Cld}.$$

Therefore, when a capacitance of the hold capacitor Chold' is equal to or greater by a predetermined magnitude than a capacitance of the first parasitic capacitor Cld of the light emitting element LD, an effect substantially identical to that of the embodiment shown in FIG. 7 can be expected without considering the capacitance of the first parasitic capacitor Cld of the light emitting element LD. Even when the capacitance of the storage capacitor Cst is changed without changing the capacitance of the hold capacitor Chold', an effect substantially identical to that of the embodiment shown in FIG. 7 can be expected.

Figure 9:
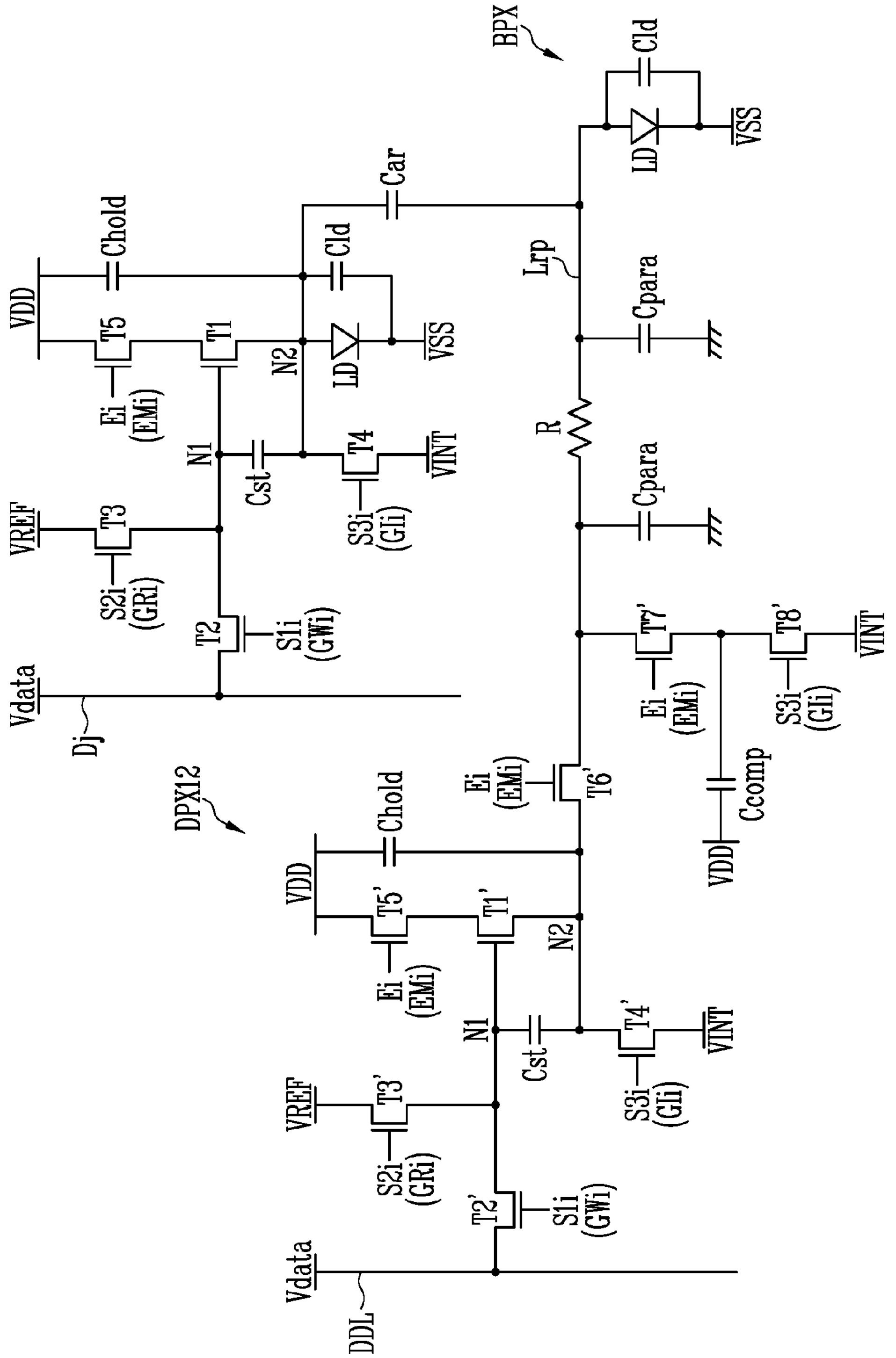
FIG. 9 is a diagram exemplifying repair of a bad pixel in the display device in accordance with another embodiment of the present disclosure.

FIG. 9 is a diagram exemplifying repair of a bad pixel in the display device in accordance with another embodiment of the present disclosure.

A dummy pixel DPX12 shown in FIG. 9 is different from the dummy pixel DPX1 shown in FIG. 7, in that the dummy pixel DPX12 does not include the auxiliary capacitor Caux and further includes a seventh transistor T7, an eighth transistor T8, and a compensation capacitor Ccomp.

The seventh transistor T7' of the dummy pixel DPX12 to may be connected between the second electrode of the sixth transistor T6' and the initialization power source VINT. For example, a first electrode of the seventh transistor T7' may be connected to the second electrode of the sixth transistor T6, a second transistor of the seventh transistor T7' may be connected to the initialization power source VINT via the eighth transistor T8, and a gate electrode of the seventh transistor T7' may be connected to the i-th emission control line Ei.

The eighth transistor T8' of the dummy pixel DPX12 may be connected between the second electrode of the seventh transistor T7' and the initialization power source VINT. For example, a first electrode of the eighth transistor T8' may be connected to the second electrode of the seventh transistor T7, a second electrode of the eighth transistor T8' may be connected to the initialization power source VINT, and a gate electrode of the eighth transistor T8' may be connected to the 3i-th scan line S3*i*.

The compensation capacitor Ccomp of the dummy pixel DPX12 may be connected between the first power source VDD and a common node connecting the seventh transistor T7' and the eighth transistor T8'. For example, a first electrode of the compensation capacitor Ccomp may be connected to the common node connecting the seventh transistor T7' and the eighth transistor T8, and a second electrode of the compensation capacitor Ccomp may be connected to to the first power source VDD. A quantity of charges, which corresponds to a difference between the voltage of the first power source VDD and the voltage of the initialization power source VINT, may be stored in the compensation capacitor Ccomp. However, the connection relationship of the compensation capacitor Ccomp is not limited thereto. For example, the first electrode of the compensation capacitor Ccomp may be connected to the common node connecting the seventh transistor T7' and the eighth transistor T8', and the second electrode of the compensation capacitor Ccomp may be connected to any one of the second power source VSS and the initialization power source VINT in another embodiment.

In accordance with an embodiment, a capacitance of the compensation capacitor Ccomp may be substantially equal to a capacitance of the first parasitic capacitor Cld formed in the light emitting element LD of the normal pixel PXij.

When the auxiliary capacitor Caux connected to one electrode of the second node N2 does not exist, the repair line Lrp is in a state in which the repair line Lrp is precharged, and therefore, the repaired pixel BPX (or the bad pixel) may emit light more brightly, in response to the same data signal, as compared with the normal pixel PXij.

Specifically, the light emitting element LD of the normal pixel PXij has a threshold voltage (e.g., 1.5V to 2V). When the anode of the light emitting element LD (or the second node N2) is initialized to the voltage (e.g., 0.5V to 1V) of the initialization power source VINT, which is lower than the threshold voltage, a portion of the driving current provided from the first transistor T1 may be consumed so as to reach the threshold voltage of the light emitting element LD. That is, the portion of the driving current provided from the first transistor T1 may be a non-emission current.

As described above, when the auxiliary capacitor Caux does not exist in the dummy pixel DPX12, the driving current provided from the first transistor T1' is not consumed as the non-emission current, and hence a larger amount of current is supplied to the repaired pixel BPX (or the bad pixel), as compared with the normal pixel PXij. Therefore, the repaired pixel BPX (or the bad pixel) may emit light more brightly.

When the eighth transistor T8' of the dummy pixel DPX12 is turned on by the third scan signal GIi, a quantity of charges, which corresponds to the difference between the voltage of the first power source VDD and the voltage of the initialization power source VINT, may be stored in the compensation capacitor Ccomp.

Subsequently, when the seventh transistor T7' of the dummy pixel DPX12 is turned off by the emission control signal EMi, the compensation capacitor Ccomp may discharge the quantity of charges. As a result, the voltage of the initialization power source VINT may be provided to the repair line Lrp, to decrease the potential of the precharged repair line Lrp.

Like the embodiment shown in FIG. 7, in the embodiment shown in FIG. 9, when it is difficult to design the auxiliary capacitor Caux in the second node N2, the compensation capacitor Ccomp having a capacitance substantially equal to a capacitance of the first parasitic capacitor Cld included in the normal pixel PXij is disposed at the second electrode of the sixth transistor T6' of the dummy pixel DPX12, so that an effect substantially identical to that of the embodiment shown in FIG. 7 can be expected.

Figure 10:
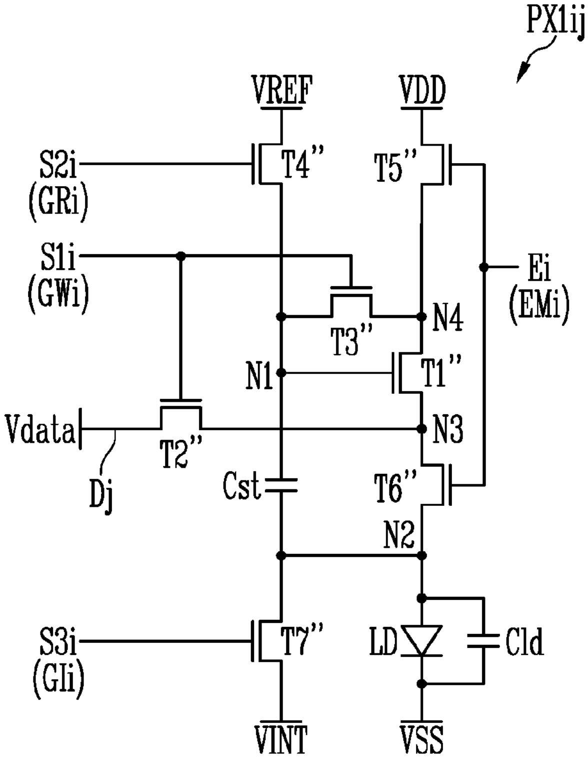
FIG. 10 is a circuit diagram illustrating another embodiment of the pixel shown in FIG. 1.

FIG. 10 is a circuit diagram illustrating another embodiment of the pixel shown in FIG. 1. For convenience of description, a pixel PX1*ij* connected to a j-th data line Dj and i-th scan lines S1*i*, S2*i*, and S3*i* will be illustrated in FIG. 10 (i is a natural number equal to or smaller than n, and j is a natural number equal to or smaller than m).

The pixel PX1*ij* may be connected to the j-th data line Dj, a 1i-th scan line S1*i*, a 2i-th scan line S2*i*, a 3i-th scan line S3*i*, and an i-th emission control line Ei.

Referring to FIG. 10, the pixel PX1*ij* in accordance with the embodiment of the present disclosure may include a first transistor T1', a second transistor T2", a third transistor T3", a fourth transistor T4", a fifth transistor T5", a sixth transistor T6", a seventh transistor T7", a storage capacitor Cst, and a light emitting element LD. A first parasitic capacitor Cld may exist in the light emitting element LD.

The first transistor T1" may be connected between the first power source VDD and a third node N3. For example, a first electrode of the first transistor T1" may be connected to the first power source VDD via the fifth transistor T5", a second electrode of the first transistor T1" may be connected to the third node N3, and a gate electrode of the first transistor T1" may be connected to a first node N1.

The first transistor T1" may serve as a driving transistor for supplying a driving current to the light emitting element LD. For example, the first transistor T1" may supply, to the light emitting element LD, a driving current corresponding to a voltage stored to the storage capacitor Cst.

The second transistor T2" may be connected between the j-th data line Dj and the third node N3. For example, a first electrode of the second transistor T2" may be connected to the j-th data line Dj, a second electrode of the second transistor T2" may be connected to the third node N3, and a gate electrode of the second transistor T2" may be connected to the 1i-th scan line S1*i*.

Accordingly, the second transistor T2" may be turned on in response to a scan signal supplied to the 1i-th scan line S1*i*. When the second transistor T2" is turned on, a data signal of the j-th data line Dj may be transferred to the third node N3.

The third transistor T3" may be connected between a fourth node N4 and the first node N1. For example, a first electrode of the third transistor T3" may be connected to the fourth node N4, a second electrode of the third transistor T3" may be connected to the first node N1, and a gate electrode of the third transistor T3" may be connected to the 1i-th scan line S1*i*.

Accordingly, the third transistor T3" may be turned on in response to the scan signal supplied to the 1i-th scan line S1*i*. When the third transistor T3" is turned on, the first transistor T1" may be diode-connected.

The fourth transistor T4" may be connected between the reference power source VREF and the first node N1. For example, a first electrode of the fourth transistor T4" may be connected to the reference power source VREF, a second electrode of the fourth transistor T4" may be connected to the first node N1, and a gate electrode of the fourth transistor T4" may be connected to the 2i-th scan line S2*i*.

Accordingly, the fourth transistor T4" may be turned on in response to a scan signal supplied to the 2i-th scan line S2*i*. When the fourth transistor T4" is turned on, the voltage of the reference power source VREF may be transferred to the first node N1.

The fifth transistor T5" may be connected between the first power source VDD and the fourth node N4. For example, a first electrode of the fifth transistor T5" may be connected to the first power source VDD, a second electrode of the fifth transistor T5" may be connected to the fourth node N4 (or the first electrode of the first transistor T1"), and a gate electrode of the fifth transistor T5" may be connected to the i-th emission control line Ei.

Accordingly, the fifth transistor T5" may be turned off in response to an emission control signal supplied to the i-th emission control line Ei.

The sixth transistor T6" may be connected between the third node N3 (or the second electrode of the first transistor T1") and a second node N2 (or an anode of the light emitting element LD). For example, a first electrode of the sixth transistor T6" may be connected to the third node N3, a second electrode of the sixth transistor T6" may be connected to the second node N2, and a gate electrode of the sixth transistor T6" may be connected to the i-th emission control line Ei.

Accordingly, the sixth transistor T6" may be turned off in response to the emission control signal supplied to the i-th emission control line Ei.

The seventh transistor T7" may be connected between the second node N2 and the initialization power source VINT.

For example, a first electrode of the seventh transistor T7" may be connected to the second node N2, a second electrode of the seventh transistor T7" may be connected to the initialization power source VINT, and a gate electrode of the seventh transistor T7" may be connected to the 3i-th scan line S3*i*.

Accordingly, the seventh transistor T7" may be turned on in response to a scan signal supplied to the 3i-th scan line S3*i*. When the seventh transistor T7" is turned on, the voltage of the initialization power source VINT may be transferred to the second node N2.

The first electrode of each of the transistors T1", T2", T3", T4", T5", T6", and T7" may be set as a source electrode or a drain electrode, and the second electrode of each of the transistors T1", T2", T3", T4", T5", T6", and T7" may be set as an electrode different from the first electrode. For example, when the first electrode is set as the drain electrode, the second electrode may be set as the source electrode.

The transistors T1", T2", T3", T4", T5", T6", and T7" included in the pixel PX1*ij* may all have the same channel type. For example, each of the transistors T1", T2", T3", T4", T5", T6", and T7" may be set to have an n-channel type.

The storage capacitor Cst may be connected between the first node N1 and the second node N2.

For example, a first electrode of the storage capacitor Cst may be connected to the first node N1, and a second electrode of the storage capacitor Cst may be connected to the second node N2. A voltage corresponding to the data signal may be stored in the storage capacitor Cst.

The first parasitic capacitor Cld may be connected between the second node N2 and the second power source VSS. For example, a first electrode of the first parasitic capacitor Cld may be connected to the second node N2, and a second electrode of the first parasitic capacitor Cld may be connected to the second power source VSS.

The light emitting element LD may be connected between the second node N2 and the second power source VSS. For example, an anode electrode of the light emitting element LD may be connected to the second node N2, and a cathode electrode of the light emitting element LD may be connected to the second power source VSS.

The light emitting element LD may be supplied with a driving current from the first transistor T1", and emit light with a luminance corresponding to the driving current.

Figure 11:
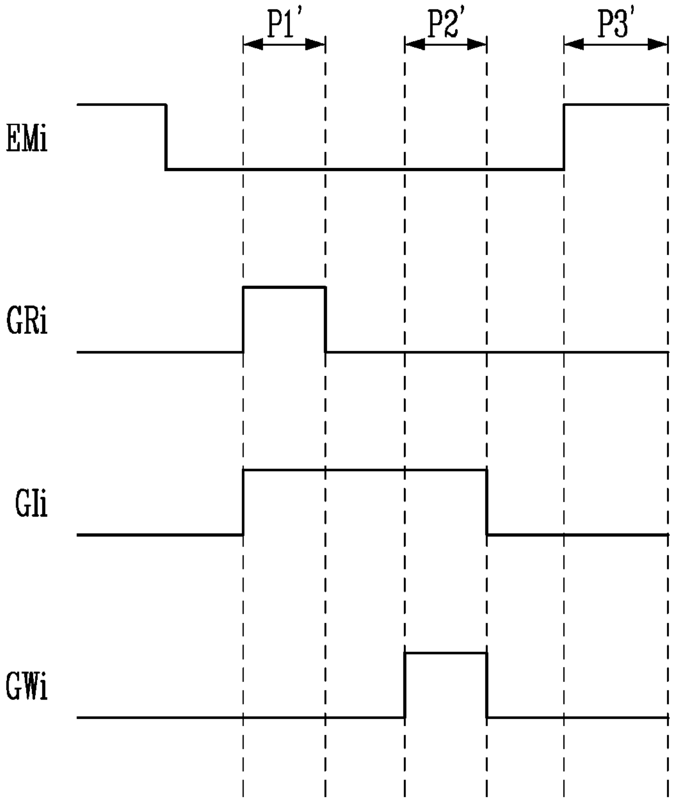
FIG. 11 is a diagram illustrating driving waveforms of signals supplied to the pixel shown in FIG. 10.

FIG. 11 is a diagram illustrating driving waveforms of signals signal supplied to the pixel shown in FIG. 10.

Referring to FIGS. 10 and 11, a driving method of the pixel PX1*ij* in accordance with the embodiment of the present disclosure may include an initialization phase, a threshold voltage compensation phase, a data writing phase, and a light emission phase.

The initialization phase may be performed during a first period P1'. In the initialization phase, the seventh transistor T7" may be turned on to supply the voltage of the initialization power source VINT to the second node N2. To this end, a third scan signal GIi may be supplied to the 3i-th scan line S3*i* during the first period P1'.

Also, in the initialization phase, the fourth transistor T4" may be turned on together with the seventh transistor T7", to supply the voltage of the reference power source VREF to the first node N1. To this end, a second scan signal GRi may also be supplied to the 2i-th scan line S2*i* during the first period P1'.

Also, in the initialization phase, the fifth transistor T5" and the sixth transistor T6" may be turned off. To this end, an emission control signal EMi may be supplied to the i-th emission control line Ei during the first period P1'.

Through the above-described initialization operation, the pixel PX1*ij* may be initialized not to be influenced by a previous unit period.

The threshold voltage compensation phase and the data writing phase may be simultaneously performed during a second period P2'. To this end, during the second period P2, a first scan signal GWi may be supplied to the 1i-th scan line S1*i*, and the third scan signal GIi supplied to the 3i-th scan line S3*i* may be maintained.

Accordingly, during the second period P2', the second transistor T2" and the third transistor T3" may be turned on, and the turn-on state of the seventh transistor T7" may be maintained.

The first transistor T1" may be diode-connected by the turned-on third transistor T3", and the data writing phase and the threshold voltage compensation phase may be performed.

Finally, the light emission phase may be performed during a third period P3'. In the light emission phase, a driving current corresponding to the voltage stored in the storage capacitor Cst may be supplied to the light emitting element LD from the first transistor T1".

To this end, the scan signals GWi, GRi, and GIi are not supplied to the 1i-th, 2i-th, and 3i-th scan lines S1*i*, S2*i*, and S3*i* during the third period P3'.

Accordingly, the second transistor T2", the third transistor T3", the fourth transistor T4", and the seventh transistor T7" may maintain the off-state.

Figure 12:
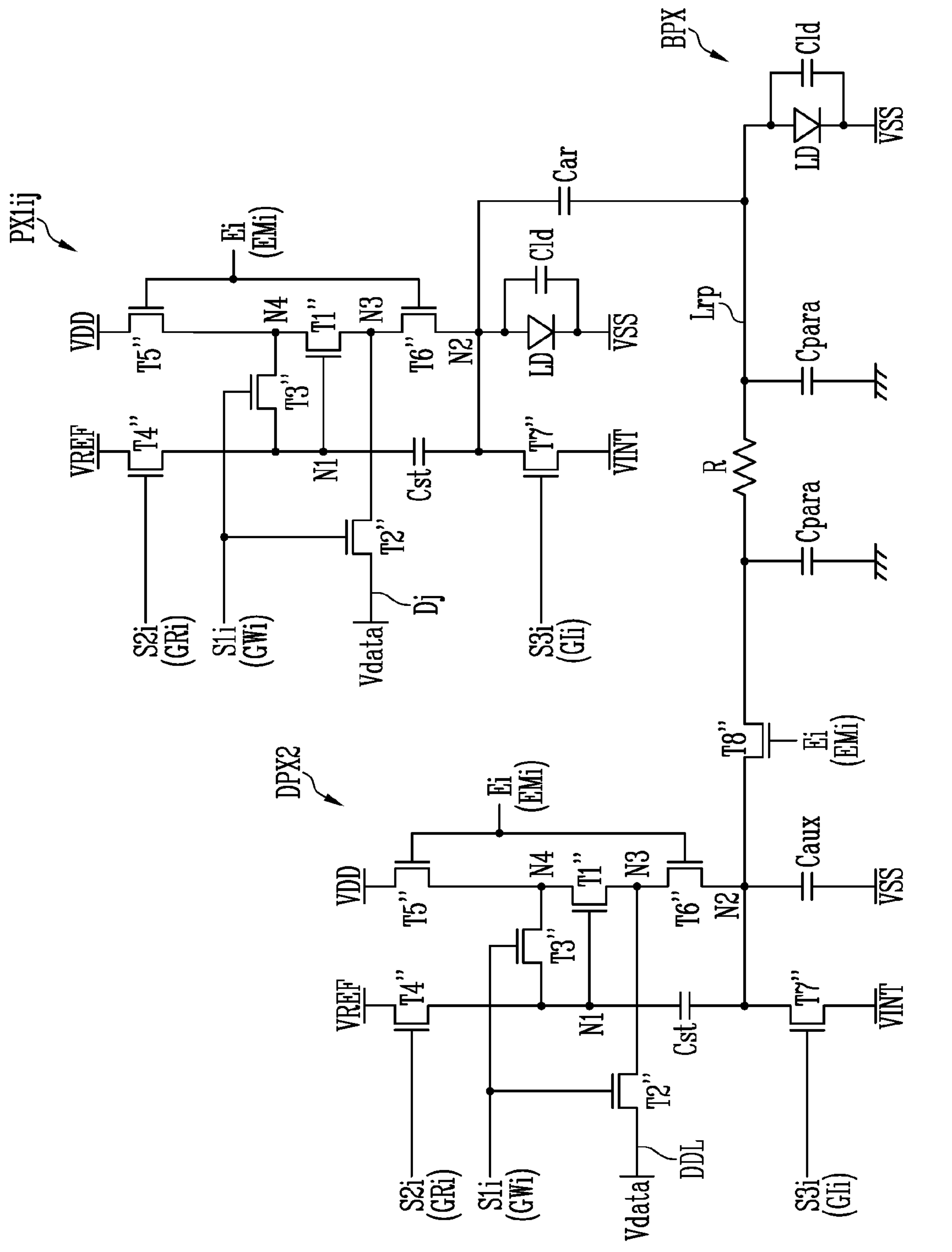
FIG. 12 is a diagram exemplifying repair of a bad pixel in the display device in accordance with another embodiment of the present disclosure.

FIG. 12 is a diagram exemplifying repair of a bad pixel in the display device in accordance with another embodiment of the present disclosure.

Referring to FIGS. 10 to 12, an eighth transistor T8" of a dummy pixel DPX2 may be connected between a second node N2 and a repair line Lrp.

For example, a first electrode of the eighth transistor T8" may be connected to the second node N2, a second electrode of the eighth transistor T8" may be connected to the repair line Lrp, and a gate electrode of the eighth transistor T8" may be connected to the i-th emission line Ei.

Accordingly, the eighth transistor T8" may be turned off in response to the emission control signal EMi supplied to the i-th emission control line Ei.

As shown in FIG. 10, the initialization phase may be performed during the first period P1'. In the initialization phase, the seventh transistor T7" may be turned on, to supply the voltage of the initialization power source VINT to the second node N2. To this end, the third scan signal GIi may be supplied to the 3i-th scan line S3*i* during the first period P1'.

Also, in the initialization phase, the fourth transistor T4" may be turned on together with the seventh transistor T7", to supply the voltage of the reference power source VREF to the first node N1. To this end, the second scan signal GRi may also be supplied to the 2i-th scan line S2*i* during the first period P1'.

Also, in the initialization phase, the fifth and sixth transistors T5" and T6" may be turned off. To this end, the emission control signal EMi may be supplied to the i-th emission control line Ei during the first period P1'.

In the initialization phase, the eighth transistor T8" may be turned off together with the fifth and sixth transistors T5" and T6", to block connection between the second node N2 and the repair line Lrp. To this end, the emission control signal EMi may also be supplied to the i-th emission control line Ei during the first period P1'.

When the eighth transistor T8" is turned off in a process of initializing the second node N2 of the dummy pixel DPX2 to the voltage of the initialization power source VINT, the connection between the second node N2 and the repair line Lrp is cut off, and therefore, a third parasitic capacitor Cpara formed in the repair line Lrp may not be initialized. When the third parasitic capacitor Cpara is not initialized, this result in an effect that the repair line Lrp is precharged. Therefore, when a data signal corresponding to a low grayscale is applied to the dummy pixel DPX2, a current Ild' is not consumed to charge the third parasitic capacitor Cpara, and hence a repaired pixel BPX (or a bad pixel) is prevented from not emitting light. Accordingly, the repaired pixel BPX (or the bad pixel) can emit light with a target luminance.

When the connection between the second node N2 and the repair line Lrp is cut off in the process of initializing the second node N2 of the dummy pixel DPX2 to the voltage of the initialization power source VINT, the repair line Lrp may be changed to a floating state. When the repair line Lrp is changed to the floating state, an anode of a light emitting element LD of the repaired pixel BPX (or the bad pixel) may not be influenced by a voltage applied to the anode of the light emitting element LD of the normal pixel PX1*ij*.

Specifically, when the fifth and sixth transistors T5" and T6" are turned off by the emission control signal EMi, the voltage applied to the anode of the light emitting element LD of the normal pixel PX1*ij* may fall, and the potential of the repair line Lrp may also fall due to a coupling phenomenon of a second parasitic capacitor Car. When the fifth and sixth transistors T5" and T6" are turned on, the voltage applied to the anode of the light emitting element LD of the normal pixel PX1*ij* may rise, and the potential of the repair line Lrp may also rise due to the coupling phenomenon of the second parasitic capacitor Car. When the repair line Lrp is in the floating state, a falling coupling element formed in the repair line Lrp when the voltage applied to the anode of the light emitting element LD of the normal pixel PX1*ij* falls and a rising coupling element formed in the repair line Lrp when the voltage applied to the anode of the light emitting element LD of the normal pixel PX1*ij* rises may be cancelled.

On the other hand, when the connection between the second node N2 and the repair line Lrp is not cut off in the process of to initializing the second node N2 of the dummy pixel DPX2 to the voltage of the initialization power source VINT, the falling coupling element formed in the repair line Lrp when the voltage applied to the anode of the light emitting element LD of the normal pixel PX1*ij* falls may be eliminated by the voltage of the initialization power source VINT, but the rising coupling element formed in the repair line Lrp when the voltage applied to the anode of the light emitting element LD of the normal pixel PX1*ij* rises may be maintained as it is. Therefore, the voltage applied to the anode of the light emitting element LD of the repaired pixel BPX (or the bad pixel) may be influenced by the coupling phenomenon.

For example, when a data signal corresponding to a full-white grayscale is applied to the normal pixel PXij, the potential of the repair line Lrp rises, and therefore, the repaired pixel BPX (or the bad pixel) may erroneously emit light with a luminance brighter than the target luminance. When a data signal corresponding to a full-black grayscale is applied to the normal pixel PXij, the potential of the repair line Lrp falls, and therefore, the repaired pixel BPX (or the bad pixel) may erroneously emit light with a luminance darker than the target luminance.

An auxiliary capacitor Caux of the dummy pixel DPX2 may be connected between the second node N2 and the second power source VSS. For example, a first electrode of the auxiliary capacitor Caux may be connected to the second node N2, and a second electrode of the auxiliary capacitor Caux may be connected to the second power source VSS. The connection relationship of the auxiliary capacitor Caux is not limited thereto. For example, the first electrode of the auxiliary capacitor Caux may be connected to the second node N2, and the second electrode of the auxiliary capacitor Caux may be connected to any one of the first power source VDD and the initialization power source VINT in another embodiment.

In accordance with an embodiment, a capacitor of the auxiliary capacitor Caux may be substantially equal to a capacitance of the first parasitic capacitor Cld formed in the light emitting element LD of the normal pixel PX1*ij*.

Even when the connection between the second node N2 of the dummy pixel DPX2 and the repair line Lrp is cut off, it is required to initialize the second node N2 of the dummy pixel DPX2 (or the anode of the light emitting element LD). When the auxiliary capacitor Caux of which one electrode is connected to the second node N2 does not exist, the repair line Lrp is in a state in which the repair line Lrp is precharged, and therefore, the repaired pixel BPX (or the bad pixel) may emit light more brightly, in response to the same data signal, as compared with the normal pixel PX1*ij*.

Specifically, the light emitting element LD of the normal pixel PX1*ij* has a threshold voltage (e.g., 1.5V to 2V). When the anode of the light emitting element LD (or the second node N2) is initialized to the voltage (e.g., 0.5V to 1V) of the initialization power source VINT, which is lower than the threshold voltage, a portion of the driving current provided from the first transistor T1" may be consumed so as to reach the threshold voltage of the light emitting element LD. That is, the portion of the driving current provided from the first transistor T1" may be a non-emission current.

When the auxiliary capacitor Caux does not exist in the dummy pixel DPX2, the driving current provided from the first transistor T1" is not consumed as the non-emission current, and hence a larger amount of current is supplied to the repaired pixel BPX (or the bad pixel) which is precharged, as compared with the normal pixel PX1*ij*. Therefore, the repaired pixel BPX (or the bad pixel) may emit light more brightly. Accordingly, the auxiliary capacitor Caux having a capacitance substantially equal to a capacitance of the first parasitic capacitor Cld included in the normal pixel PX1*ij* is included in the dummy pixel DPX2, so that the repaired pixel BPX (or the bad pixel) can normally emit light.

Hereinafter, an application field of the display device 1000 in accordance with an embodiment of the present disclosure will be described with reference to FIGS. 13 and 14.

Figure 13:
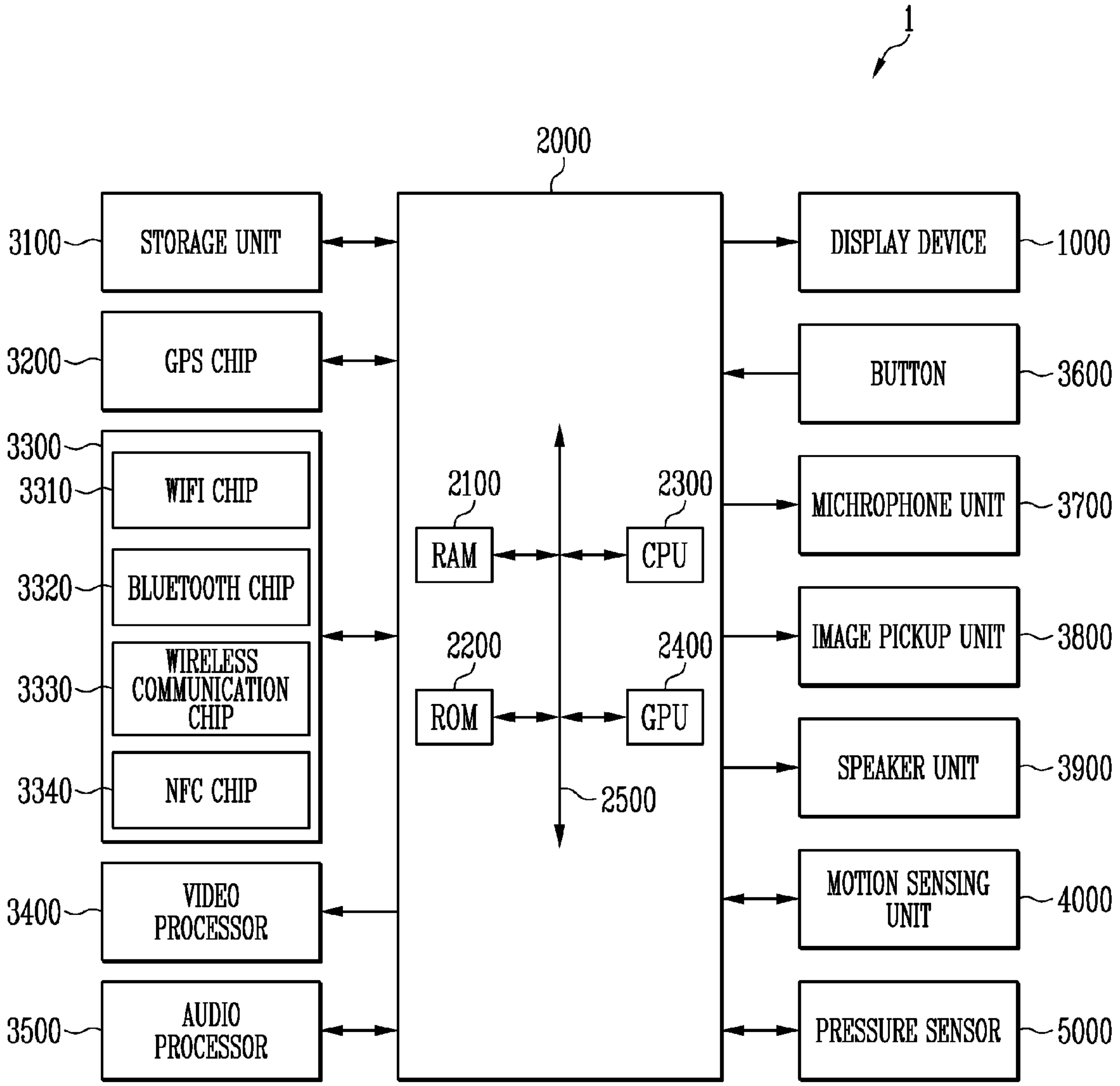
FIG. 13 is a block diagram illustrating an embodiment of an electronic device to which the present disclosure is applied.

FIG. 13 is a block diagram illustrating an embodiment of an electronic device to which the present disclosure is applied. FIG. 14 is a diagram illustrating a structure of software stored in the electronic device shown in FIG. 13

Mobile phones, smart phones, laptop computers, digital broadcasting terminals, navigation systems, and the like may be included in the electronic device 1 described in this specification. However, the present disclosure is not limited thereto, and the electronic device 1 may be applied to digital TVs, desktop computers, and the like.

Referring to FIG. 13, the electronic device 1 may include the display device 1000, a controller 2000, a storage unit 3100, a Global Positioning System ("GPS") chip 3200, a communication unit 3300, a video processor 3400, an audio processor 3500, a button 3600, a microphone unit 3700, an image pickup unit 3800, a speaker unit 3900, a motion sensing unit 4000, and a pressure sensor 5000.

As used in connection with various embodiments of the disclosure, the term "module/unit" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

The display device 1000 may include a touch sensor for sensing a touch gesture of a user. The touch sensor may be implemented as various types of sensors such as a capacitive type, a pressure sensitive type, and a piezoelectric type. The capacitive type may be a method of calculating a touch coordinate by detecting a nano electricity caused to a body of a user when a part of body of the user touches a surface of a touch screen, based on a dielectric substance coated onto the surface of the touch screen. The pressure sensitive type, which includes two electrode plates, may be a method of calculating a touch coordinate by, when a user touches a screen, detecting flowing of a current when an upper plate and a lower plate touch at a point of touch input. In addition, when the electronic device 1 supports a pen input function, the display device 1000 may also sense a user gesture using an input means such as a pen in addition to a finger of a user. When the input means is a stylus pen including a coil therein, the electronic device 1 may include a magnetic field sensor capable of sensing a magnetic field changed by the coil in the stylus pen. Accordingly, the electronic device 1 can also sense a proximity gesture, i.e., hovering in addition to the touch gesture.

The storage unit 3100 may store various programs and data, which are necessary for operations of the electronic device 1. The controller 2000 may control an operation of the display device 1000 by using the programs and data, stored in the storage unit 3100. The controller 2000 may include a Random-Access Memory ("RAM") 2100, a Read Only Memory ("ROM") 2200, a Central Processing Unit ("CPU") 2300, a Graphic Processing Unit ("GPU") 2400, and a bus 2500. The RAM 2100, the ROM 2200, the CPU 2300, the GPU 2400, and the like may be connected to each other through the bus 2500.

The CPU 2300 may access the storage unit 3100, and perform booting by using an Operating System ("O/S") stored in the storage unit 3100. Also, the CPU 2300 may perform various operations by various programs, contents, data, and the like, which are stored in the storage unit 3100.

A command set for booting a system and the like may be stored in the ROM 2200. When a turn-on command is input and power is supplied, the CPU 2300 may copy the O/S stored in the storage unit 3100 to the RAM 2100 according to a command stored in the ROM 2200 and execute the O/S to boot the system. When the booting is completed, the CPU 2300 may copy various programs stored in the storage unit 3100 to the RAM 2100, and execute the programs copied to the RAM 2100 to perform various operations. When the electronic device 1 is completely booted, the GPU 2400 may display a UI screen in the display device 1000. Specifically, the GPU 2400 may generate a screen including various objects such as an icon, an image, and a text by using a calculator (not shown) and a rendering unit (not shown). The calculator may calculate an attribute value such as a coordinate value, a shape, a size, and a color, with which each object is to be displayed, according to a layout of the screen. The rendering unit may generate a screen of various layouts including objects, based on the attribute value calculated by the calculator. The screen generated by the rendering unit may be provided to the display device 1000, to be displayed in a display area.

The GPS chip 3200 is a component for calculating a current position of the electronic device 1 by receiving a GPS signal from a GPS satellite. The controller 2000 may calculate a user position by using the GPS chip 3200, when a navigation program is used or when a current position of a user is necessary.

The communication unit 3300 is a component for performing communication with various types of external devices according to various types of communication schemes. The communication unit 330 may include a WiFi chip 3310, a Bluetooth chip 3320, a wireless communication chip 3330, and a Near Field Communication ("NFC") chip 3340. The controller 2000 may perform communication with various types of external devices by using the communication unit 3300.

The WiFi chip 3310 and the Bluetooth chip 3320 may perform communication respectively according to a WiFi scheme and a Bluetooth scheme. When the WiFi chip 3310 or the Bluetooth chip 3320 is used, various connection information such as an SSID and a session key may be transmitted and received first, communication may be connected by using the various connection information, and then various information may be transceived. The wireless communication chip 3330 refers to a chip which performs communication according to various communication standards such as IEEE, ZigBee, 3rd Generation ("3G"), 3rd Generation Partnership Project ("3GPP"), and Long-Term Evolution ("LTE"). The NFC chip 3340 refers to a chip operating in NFC scheme using 13.56 megahertz (MHz) band from among various RF-ID frequency bands a such as from 135 kilohertz (kHz), 13.56 MHz, 433 MHz, 860-960 MHz, and 2.45 gigahertz (GHz).

The video processor 3400 is a component for processing video data included in contents received from the communication unit 3300 or contents stored in the storage unit 3100. The video processor 3400 may perform various image processing such as decoding, scaling, noise filtering, frame rate conversion, and resolution conversion on the video data.

The audio processor 3500 is a component for processing audio data included in contents received through the communication unit 3300 or contents stored in the storage unit 3100. The audio processor 3500 may perform various processing such as decoding or amplification and noise filtering on the audio data.

When a reproduction program on a multimedia content is executed, the controller 2000 may reproduce the corresponding content by driving the video processor 3400 and the audio processor 3500.

The display device 1000 may display an image frame generated by the video processor 3400 in the display area.

In addition, the speaker unit 3900 may output audio data generated by the audio processor 3500.

The button 3600 may include various types of buttons such as a mechanical button, a touch pad, and a wheel, which are formed in an arbitrary area such as a front part, a side part, or a rear part of the body appearance of the electronic device 1.

The microphone unit 3700 is a component for receiving a user voice or another sound to convert the user voice or the sound into audio data. The controller 2000 may use the user voice received through the microphone unit 3700 in a call process, or convert the user voice into audio data to be stored in the storage unit 3100.

The image pickup unit 3800 is a component from photographing a still image or a moving image under the control of a user. The image pickup unit 380 may be implemented in plurality, such as a front camera and a rear camera. As described above, the image pickup unit 3800 may be used as a means for acquiring an image of the user in an embodiment for tracing eyes of the user.

When the image pickup unit 3800 and the microphone unit 3700 are provided, the controller 2000 may perform a control operation according to a user voice input through the microphone unit 3700 or a user motion recognized by the image pickup unit 3800. That is, the electronic device 1 may operate in a motion control mode or a voice control mode. When the electronic device 1 operates in the motion control mode, the controller 2000 may photograph a user by activating the image pickup unit 3800, and trace a motion change of the user to perform a control operation in response to the traced motion change. When the electronic device 1 operates in the voice control mode, the controller 2000 may analyze a user voice input through the microphone unit 3700, and perform a control operation according to the analyzed user voice.

In the electronic device 1 supporting the motion control mode and the voice control mode, a voice recognition technique or a motion recognition technique may be used in the above-described various embodiments. When a user takes a motion as if the user selects an object displayed on a home screen or when the user pronounces a voice command corresponding to the object, the controller 2000 may determine that the corresponding object has been selected, and perform a control operation corresponding to the object.

The motion sensing unit 4000 is a component for sensing a motion of the body of the electronic device 1. That is, the electronic device 1 may be rotated or inclined in various directions. The motion sensing unit 4000 may sense a motion characteristic such as a rotational direction, an angle, or an inclination by using at least one of various sensors such as a geometric sensor, a gyro sensor, and an acceleration sensor.

The pressure sensor 5000 is a component for sensing a pressure applied to the display device 1000.

Although not shown in FIG. 13, in some embodiments, the electronic device 1 may further include a USB port to which a USB connector can be connected, various external input ports for connecting various external terminals of a headset, a mouse, a LAN, and the like, a Digital Multimedia Broadcasting ("DMB") chip for receiving and processing DMB signals, various sensors, and the like.

As described above, various programs may be stored in the storage unit 3100.

Figure 14:
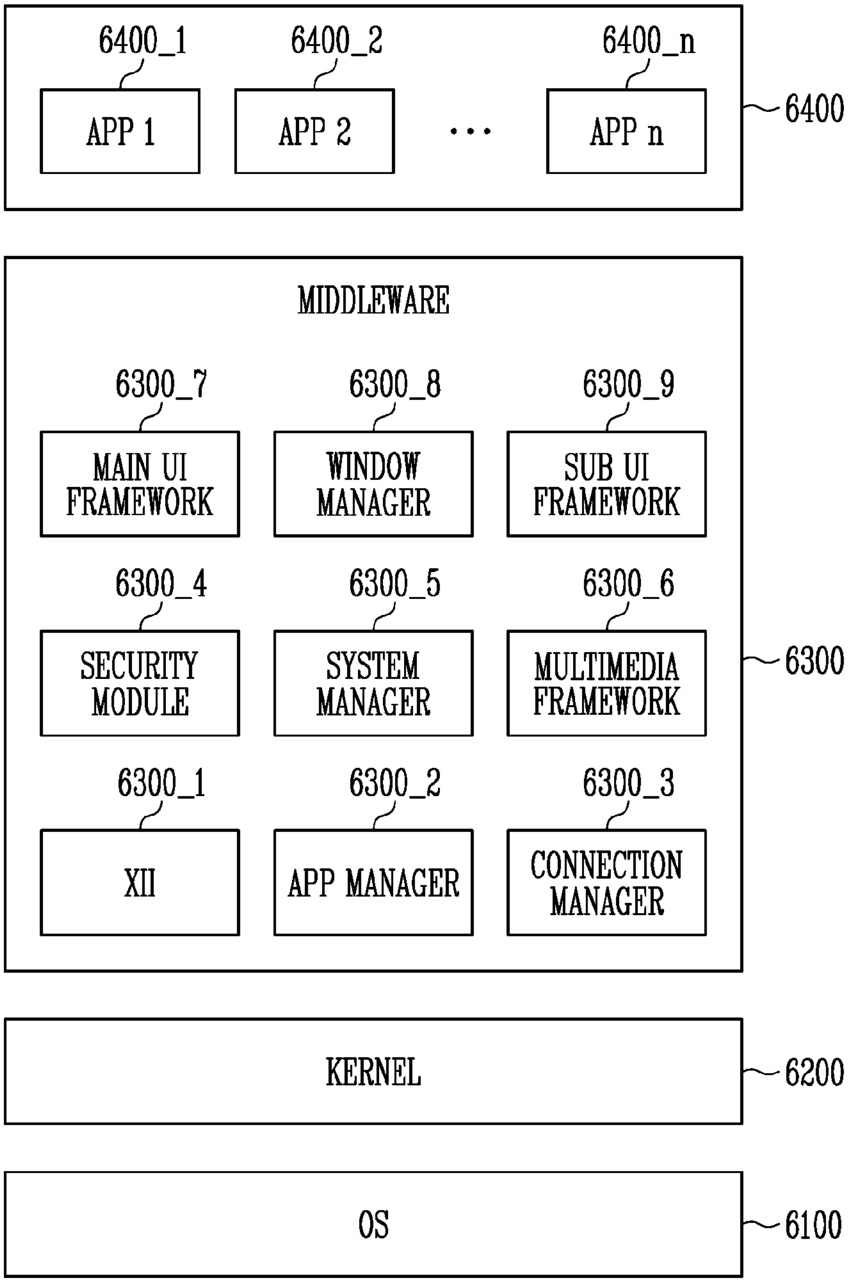
FIG. 14 is a diagram illustrating a structure of software stored in the electronic device shown in FIG. 13.

FIG. 14 is a diagram illustrating a structure of software stored in the electronic device in accordance with an embodiment of the present disclosure.

Referring to FIG. 14, software including an Operating System ("OS") 6100, a kernel 6200, a middleware 6300, an application module 6400, and the like may be stored in the storage unit 3100.

The OS 6100 may perform a function of controlling and managing overall operations of hardware. That is, the OS 6100 is a layer for taking charge of fundamental functions such as hardware management and memory security.

The kernel 6200 may serve as a path through which various signals including a touch signal and the like, which are sensed in the display device 1000, are transferred to the middleware 6300.

The middleware 6300 may include various software modules for controlling operations of the electronic device 1. According to FIG. 14, the middleware 6300 may include a XII module 6300_1, an APP manager 6300_2, a connection manager 6300_3, a security module 6300_4, a system manager 6300_5, a multimedia framework 6300_6, a main UI framework 6300_7, a window manager 6300_8, and a sub-UI framework 6300_9.

The XII module 6300_1 is a module for receiving various event signals from various hardware provided in the electronic device 1. The event may be variously set, such as an event in which a user gesture is sensed, an event in which a system alarm occurs, and an event in which a specific program is executed or ended.

The APP manager 6300_2 is a module for managing an execution state of various applications installed in the storage unit 3100. When an application execution event is sensed from the XII module 6300_1, the APP manager 6300_2 may call and execute an application corresponding to the corresponding event.

The connection manager 6300_3 is a module for supporting wired or wireless network connection. The connection manager 6300_3 may include various sub-modules such as a DNET module and a UPnP module.

The security module 6300_4 is a module for supporting certification, request permission, secure storage, and the like on hardware.

The system manager 6300_5 may monitor a state of each component in the electronic device 1, and provide the monitoring result to other modules. When battery remains are insufficient, when an error occurs, when communication connection is cut off, the system manager 6300_5 may output a notification message or a notification sound by providing the monitoring result to the main UI framework 6300_7 or the sub-UI framework 6300_9.

The multimedia framework 6300_6 is a module for reproducing a multimedia content which is stored in the electronic device 1 or is provided from the external source. The multimedia framework 6300_6 may include a player module, a camcorder module, a sound processing module, and the like. Accordingly, an operation of generating and reproducing a screen and a sound by reproducing various multimedia contents can be performed.

The main UI framework 6300_7 is a module for providing various UIs to be displayed in a main area of the display device 1000, and the sub-UI framework 6300_9 is a module for providing various UIs to be displayed in an edge area of the display device 1000. The main UI framework 6300_7 and the sub-UI framework 6300_9 may include an image compositor module for organizing various kinds of objects, a coordinate compositor module for calculating a coordinate at which an object is to be displayed, a rendering module for rendering the organized object at the calculated coordinate, a 2D/3D UI toolkit for providing a tool used to organize a 2D/3D UI, and the like.

The window manager 6300_8 may sense a touch event using a body of a user or a pen, or another input event. When such an event is sensed, the window manager 6300_8 may transfer an event signal to the main UI framework 6300_7 or the sub-UI framework 6300_9 to allow the main UI framework 6300_7 or the sub-UI framework 6300_9 to perform an operation corresponding to the event.

In addition, various program modules may be stored, such as a writing module for, when a user touches or drags a screen, drawing a line along a dragging track of the screen, and an angle calculation module for calculating a pitch angle, a roll angle, a yaw angle, or the like, based on a sensor value sensed by the motion sensing unit 4000.

The application module 6400 may include applications 6400_1 to 6400_n for supporting various functions. For example, the application module 6400 may include program modules for providing various services, such as a navigation program module, a game module, an electronic book module, a calendar module, and a notification management module. These applications may be installed as a default, and a user may arbitrarily install the applications to be used. When an object is selected, the CPU 2300 may execute an application corresponding to the selected object by using the application module 6400.

The structure of the software shown in FIG. 14 is merely an example, and therefore, the present disclosure is not necessarily limited thereto. It will be apparent that some of the above-described components may be omitted, modified or added, if necessary.

Various programs may be additionally provided in the storage unit 3100, such as a sensing module for analyzing signals sensed by various types of sensors, a messaging module such as a messenger program, a Short message Service ("SMS") & Multimedia Message Service ("MMS") program, and an email program, a call information aggregator program module, a VoIP module, and a web browser module.

As described above, the electronic device 1 may be implemented with various types of devices such as a mobile phone, a tablet PC, and a laptop PC. Therefore, the configurations described in FIGS. 13 and 14 may be variously modified according to the kind of the electronic device 1.

In the display device in accordance with the present disclosure, a light emitting element of a repaired pixel (or bad pixel) can normally emit light, corresponding to a data signal (or grayscale value) provided from a repair pixel (or dummy pixel).

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a first transistor connected between a first power source and a second node, and including a gate electrode connected to a first node;

a second transistor connected between a data line and the first node, and including a gate electrode connected to a first scan line;

a fourth transistor connected to the second node, the fourth transistor including a gate electrode connected to a third scan line;

a fifth transistor connected between the first power source and the first transistor, and including a gate electrode connected to an emission control line;

a storage capacitor connected between the first node and the second node;

a repair line including a first end connected to the second node, wherein the second node is electrically connected to a DC power source, wherein the DC power source is an initialization power source different from the first power source;

a light emitting element of a normal pixel including an anode and connected to a second power source, wherein a parasitic capacitor is formed between the anode and a second end of the repair line, wherein the second end is opposite to the first end; and a sixth transistor including a first electrode connected to the second node, a second electrode connected to the first end of the repair line, wherein the repair line is disposed between the sixth transistor and the light emitting element of the normal pixel and electrically connects the sixth transistor to the light emitting element, and wherein, during a period in which the fourth transistor is turned on, the sixth transistor is turned off.

2. The display device of claim 1, further comprising a hold capacitor connected between the first power source and the second node.

3. The display device of claim 1, further comprising:

a seventh transistor connected between the second electrode of the sixth transistor and an initialization power source, and including a gate electrode connected to the emission control line;

an eighth transistor connected between the seventh transistor and the initialization power source, and including a gate electrode connected to the third scan line; and a compensation capacitor connected between the first power source and a common node connecting the seventh transistor and the eighth transistor.

4. The display device of claim 3, wherein, during a period in which the eighth transistor is turned on, the seventh transistor is turned off.

5. The display device of claim 1, further comprising a third transistor connected between the first node and a reference power source, and including a gate electrode connected to a second scan line.

6. The display device of claim 1, wherein each of the first, second, and fourth to sixth transistors is an N-channel metal oxide semiconductor (NMOS) transistor.

7. The display device of claim 1, further comprising a display panel, wherein the display panel includes a display area including the normal pixel and a non-display area including a dummy pixel, and wherein the dummy pixel includes the first, second, and fourth to sixth transistors and the storage capacitor.

8. A display device comprising:

a first transistor connected between a first power source and a second node, and including a gate electrode connected to a first node;

a second transistor connected between a data line and the first node, and including a gate electrode connected to a first scan line;

a fourth transistor connected to the second node, the fourth transistor including a gate electrode connected to a third scan line;

a fifth transistor connected between the first power source and the first transistor, and including a gate electrode connected to an emission control line;

a storage capacitor connected between the first node and the second node;

a repair line including a first end connected to the second node, wherein the second node is electrically connected to a DC power source;

a light emitting element of a normal pixel including an anode and connected to a second power source, wherein a parasitic capacitor is formed between the anode and a second end of the repair line, wherein the second end is opposite to the first end; and a sixth transistor including a first electrode connected to the second node, a second electrode connected to the first end of the repair line, and a gate electrode connected to the emission control line, wherein, during a period in which the fourth transistor is turned on, the sixth transistor is turned off.

9. A display device comprising:

a first transistor connected between a first power source and a second node, and including a gate electrode connected to a first node;

a second transistor connected between a data line and the first node, and including a gate electrode connected to a first scan line;

a fourth transistor connected to the second node, the fourth transistor including a gate electrode connected to a third scan line;

a fifth transistor connected between the first power source and the first transistor, and including a gate electrode connected to an emission control line;

a storage capacitor connected between the first node and the second node;

a repair line including a first end connected to the second node, wherein the second node is electrically connected to a DC power source;

a light emitting element of a normal pixel including an anode and connected to a second power source, wherein a parasitic capacitor is formed between the anode and a second end of the repair line, wherein the second end is opposite to the first end; and a sixth transistor including a first electrode connected to the second node, a second electrode connected to the first end of the repair line, and a gate electrode connected to the emission control line, wherein the repair line is disposed between the sixth transistor and the light emitting element of the normal pixel and electrically connects the sixth transistor to the light emitting element, wherein the fifth transistor and the sixth transistor are turned on and off at a same time.

* * * * *